(12) United States Patent
Matthews et al.

(10) Patent No.: US 12,395,260 B1
(45) Date of Patent: Aug. 19, 2025

(54) TIME ALIGNED MULTI-PACKET DELIVERY

(71) Applicant: Marvell Asia Pte Ltd, Singapore (SG)

(72) Inventors: William Brad Matthews, Los Gatos, CA (US); Puneet Agarwal, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 305 days.

(21) Appl. No.: 18/101,850

(22) Filed: Jan. 26, 2023

Related U.S. Application Data

(60) Provisional application No. 63/390,983, filed on Jul. 21, 2022.

(51) Int. Cl.
*H04J 3/06* (2006.01)
*H04L 7/00* (2006.01)
*H04L 43/0852* (2022.01)
*H04L 45/00* (2022.01)
*H04L 45/16* (2022.01)

(52) U.S. Cl.
CPC .......... *H04J 3/0661* (2013.01); *H04J 3/0682* (2013.01); *H04L 43/0852* (2013.01); *H04L 45/16* (2013.01)

(58) Field of Classification Search
CPC ...... H04J 3/0688; H04J 3/0697; H04J 3/0638; H04J 3/0673; H04L 43/087; H04L 45/00; H04L 45/16; H04L 45/24; H04L 45/30; H04L 45/14; H04L 45/34
See application file for complete search history.

(56) References Cited

U.S. PATENT DOCUMENTS

| | | | |
|---|---|---|---|
| 2007/0248038 A1* | 10/2007 | Yamasaki | H04B 7/022 370/328 |
| 2009/0067323 A1* | 3/2009 | Matsushima | H04L 41/0677 370/225 |
| 2013/0301551 A1* | 11/2013 | Ghosh | H04L 27/266 370/329 |
| 2013/0308660 A1* | 11/2013 | Huang | H04J 3/0682 370/518 |
| 2023/0188239 A1* | 6/2023 | Huang | H04L 1/08 370/350 |
| 2023/0284073 A1* | 9/2023 | Sudhakaran | H04L 47/2408 370/230 |
| 2023/0397084 A1* | 12/2023 | Shah | H04W 40/12 |

* cited by examiner

Primary Examiner — Awet Haile
(74) Attorney, Agent, or Firm — Shield Intellectual Property PC; Zhichong Gu

(57) ABSTRACT

Path-specific delay variations in a computer communication network between a time-sensitive nexus node and time-sensitive non-nexus nodes are determined. The time-sensitive nexus node determines, based on the path-specific delay variations, copy-specific delay alignment compensations for copies of a multi-destination communication packet to be sent by the time-sensitive nexus node to the time-sensitive non-nexus nodes respectively. The time-sensitive nexus node uses the per-copy delay alignment compensations to perform per-copy delay alignment operations with respect to the copies of the multi-destination communication packet. The time-sensitive nexus node sends each copy in the copies of the multi-destination communication packet to a respective time-sensitive non-nexus node in the time-sensitive non-nexus nodes after a respective per-copy delay alignment operation in the per-copy delay alignment operations is performed for the copy of the multi-destination communication packet.

21 Claims, 15 Drawing Sheets

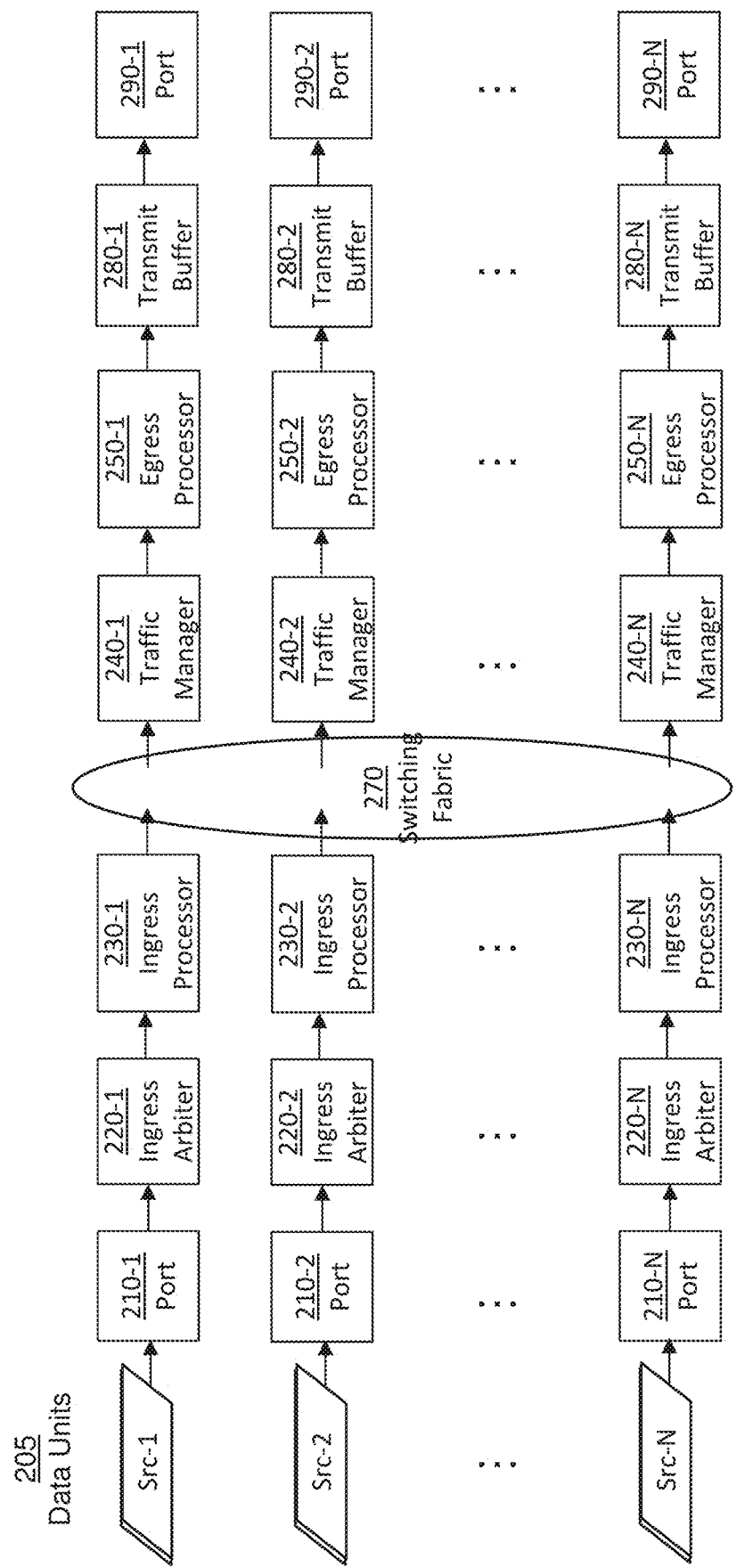

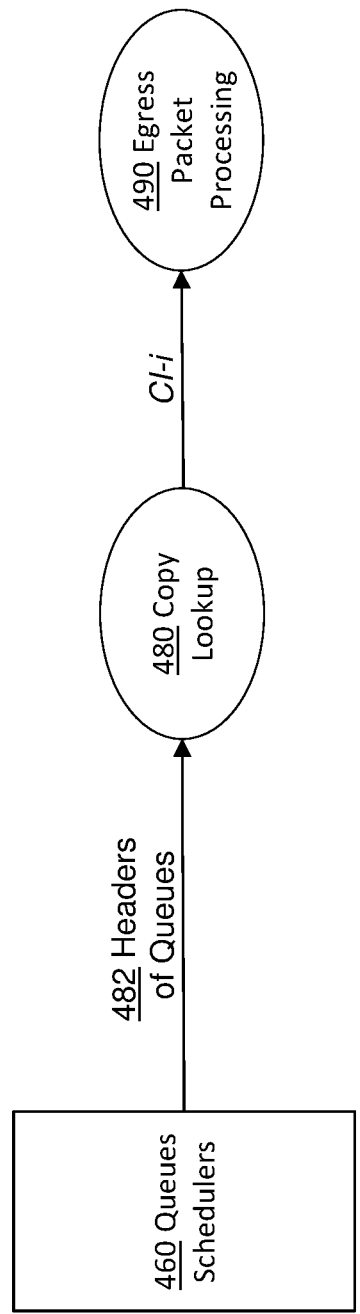

TIME ALIGNED MULTI-PACKET DELIVERY

This application claims benefit under 35 U.S.C. § 119(e) of Provisional Application No. 63/390,983, filed Jul. 21, 2022, the entire contents of which is hereby incorporated by reference as if fully set forth herein.

TECHNICAL FIELD

Embodiments relate generally to packet delivery, and, more specifically, to time aligned multi-packet delivery.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Low latency is typically a predominant goal for data communication networks that are used in high performance computing (HPC) and data center (DC) operations. However, in some operational scenarios, data communication clients may be time sensitive as to whether the same information encapsulated in network packets is delivered and received by these time sensitive clients at the same time or within relatively short time differences. Different outcomes can be inadvertently and/or unfairly generated if the same information is delivered to only a few of these clients with relatively low latency while to other clients with higher latency. The clients that obtain the information earlier than others can radically or meaningfully interact with the source of the information and alter the information at the source. As a result, the information received by the other time sensitive clients with high latencies becomes stale, expired or otherwise incorrect at the outset to these other clients or computing applications running therein.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 2A illustrates an example network device; FIG. 2B and FIG. 2C illustrate example multi-destination enqueuing and dequeuing operations;

DETAILED DESCRIPTION

Figure 1A:
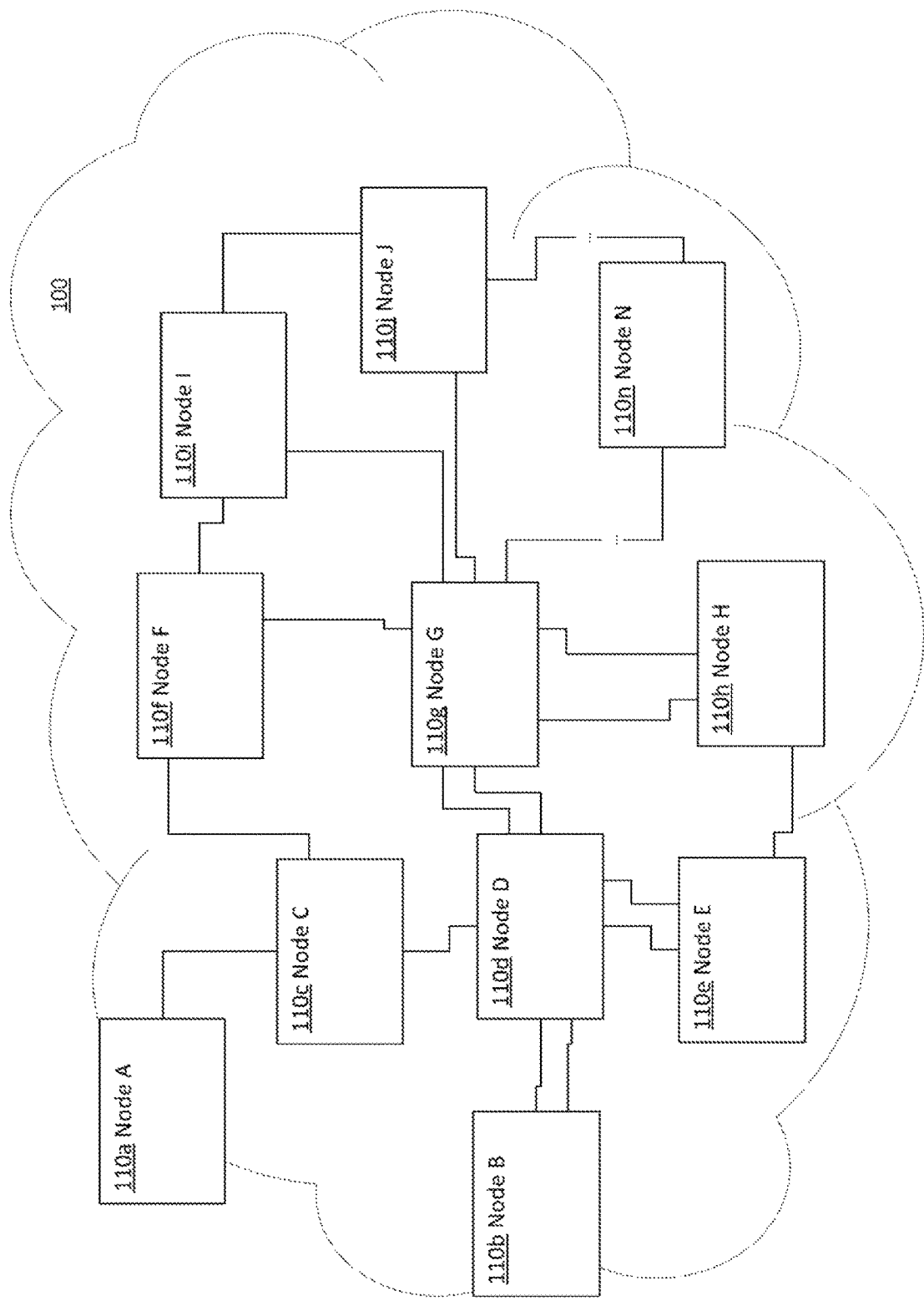
FIG. 1A and FIG. 1B illustrate example networking systems.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:
- 1.0. General Overview
- 2.0. Structural Overview
  - 2.1. Data Units
  - 2.2 Network Paths
  - 2.3 Network Device
  - 2.4. Ports
  - 2.5. Packet Processors
  - 2.6. Buffers
  - 2.7. Queues
  - 2.8. Traffic Management
  - 2.9. Forwarding Logic
  - 2.10. Multi-Destination Enqueuing and Dequeuing
  - 2.11. Time Sensitive Communications
  - 2.12. Miscellaneous
- 3.0. Functional Overview
  - 3.1. Intrinsic or Inherent Delay Variations
  - 3.2. Delay Variation Compensation
  - 3.3. Copy Generation Dataflow
  - 3.4. Per Copy Delay Alignment
  - 3.5. Egress Port Dequeue Alignment
  - 3.6 Alignment Covering Different Types of Delay Variations
  - 3.7. Reducing DET Data Size Through Indirection
  - 3.8. Per Burst Delay Alignment
  - 3.9. Window-Based Delay Alignment
  - 3.10. Multi-Hop and/or Last-Hop Delay Alignment
- 4.0. Example Embodiments
- 5.0 Implementation Mechanism—Hardware Overview
- 6.0 Extensions and Alternatives
- 7.0. Enumerated Exemplary Embodiments

1.0. General Overview

Multiple kinds of delay variations can occur within and without a network node. For example, within a network node such as a switching device, packets or data units or cells can be switched or transferred from various ingress or source buffers to egress destination buffers through a crossbar, switching fabric, or inter-connect. Different delays may be incurred for different combinations of source and destination buffers.

Packets received from different sources and thereafter forwarded to different destinations can be processed by different processing components in the same switching device such as different packet processors, queueing logics, traffic managers, packet replication logics, buffers, ports, etc. Packet processing by different processing components within the switching device is prone to incur different delays for different traffic flows handled by the switching device.

Different delays can also be incurred when packets with different combinations of sources and destinations traverse different transmission media and different network nodes with different distances over one or more different hops from one network node to the next.

Delays and delay variations within the same switching device and/or across multiple hops or devices may be measured and analyzed using real or test traffic data collected with tracing packets or timestamps affixed by various packet processing components and/or devices for different combinations of sources and destinations. A major part of the delays or delay variations may be deterministic, constant or fixed, or dependent on sources and/or destinations. A minor part of the delays or delay variations may be random and unpredictable, such as those associated with asynchronous operations or time-dependent orders varying over time.

Under techniques as described herein, delay alignment can be implemented and used to (e.g., entirely, etc.) compensate for (e.g., a major part of, etc.) the delay variations that are deterministic, constant or fixed, or dependent on sources and/or destinations. Additionally, optionally, alternatively, these techniques can be extended or used to compensate for additional delay variations that may not be constant or fixed but do exhibit a deterministic (e.g., statistic, time, daily, weekly, seasonal, etc.) pattern, for example through dynamic or adaptive application of delay alignment based at least in part on the detected statistical pattern.

The delay alignment techniques as described herein can be used individually or collectively to reduce or prevent delay variations and to allow a time-sensitive communication party (referred to herein as "nexus node") to communicate with a plurality of time-sensitive counter-parties (referred to herein as "non-nexus nodes") in a time-sensitive packet-based communication application such as a time-sensitive multi-destination application. In a multi-destination application, a multi-destination packet—e.g., in a sequence of multi-destination packets—is a packet for which one or more copies are made internally and sent to multiple destinations. Multi-destination packets can include multi-destination packets, mirrored packets, and any other mechanism for replicating packets.

In an example, in the time-sensitive multi-destination application, per copy delay alignment may be applied to each copy of the same source node packet. In some operational scenarios, delay alignment time (AT) information for each such copy may be looked up, for example at the time when the copy is generated or replicated from a received packet at an intermediate network node. Overall delay alignment time information for a plurality of copies of the same source node packet can be used to determine individual delay compensation times for these copies. A specific optimized/minimized delivery time—with minimized delay—of these copies to their respective time-sensitive clients or non-nexus nodes can be determined or scheduled according to the overall delay alignment time information for the plurality of copies. Local or remote egress ports can be used, invoked or instructed to perform per-copy delay alignment based on copy-specific or per-copy departure eligible times—respectively set for these (packet) copies based on the individual delay compensation times—that are used to cause these copies to arrive at the time-sensitive clients or non-nexus nodes at the specific time within a relatively strict time window such as within a time precision of nanosecond or sub-nanosecond. A departure eligible time as described herein refers to a specific time point at which a packet becomes eligible for departure from a packet processing component including but not limited to an egress port. Additionally, optionally or alternatively, in some operational scenarios, memory indirection can be used to capture alignment time information for only a subset of packets involved in time-sensitive packet forwarding applications, thereby reducing memory usage and storing only the alignment time information with relatively high time resolution/precision for those packets involved in the time-sensitive communications.

In some operational scenarios, time-sensitive packets—or packets in time-sensitive communications—may be received, transmitted or delivered at relatively low average rates but with occasional bursts. Instead of allocating or using delay compensation times for each packet in a burst, a delay alignment operation may be performed with respect to the very first packet in the burst arriving to an empty queue. Subsequent packets that follow the very first packet and that arrive to the same queue presently in a non-empty state are not delay aligned. This may be used to significantly reduce computational and memory costs of delay alignment operations while at the same ensuring each burst starting to arrive at the time-sensitive clients or devices at the same time.

In some operational scenarios, a relatively coarse time scale window-based delay alignment may be used to eliminate delay variations by way of using a numeric value or identifier to specify a specific transmit window that is aligned across egress ports and/or network devices. The window-based alignment can be extended across multiple egress ports and/or multiple network devices and/or multiple types of transmission media in heterogeneous and/or hierarchical operational environments so long as time is synchronized across these ports and/or devices. As much of the window-based delay alignment can be performed with relatively coarse time information, memory costs can be significantly reduced, even when a relatively large number of packets are involved in time-sensitive communications.

It should be noted that, in various operational scenarios, delay alignment operations as described herein can be implemented within a specific network device, within a specific group of network devices, or a relatively large number of network devices in a network system. Additionally, optionally or alternatively, multi-hop delay alignment involving network devices of multiples hops can be implemented or used to eliminate delay variations in time-sensitive communications. Additionally, optionally or alternatively, last-hop delay alignment involving last-hop network devices, attendant devices or components operating in conjunction with the last-hop network devices can be implemented or used to eliminate delay variations in time-sensitive communications.

Approaches, techniques, and mechanisms are disclosed for removing delay variations in delivering packets or data units within networks. Path-specific delay variations in a computer communication network between a time-sensitive nexus node and a plurality of time-sensitive non-nexus nodes are determined. The time-sensitive nexus node determines, based on the path-specific delay variations, a plurality of copy-specific delay alignment compensations for a plurality of copies of a multi-destination communication packet. The plurality of copies of the multi-destination communication packet is to be sent by the time-sensitive nexus node to the plurality of time-sensitive non-nexus nodes respectively. The time-sensitive nexus node uses the plurality of per-copy delay alignment compensations to perform a plurality of per-copy delay alignment operations with respect to the plurality of copies of the multi-destination communication packet. The time-sensitive nexus node sends each copy of the multi-destination communication packet in the plurality of copies of the multi-destination communication packet to a respective time-sensitive non-nexus node in the plurality of time-sensitive non-nexus nodes after a respective per-copy delay alignment operation in the plurality of per-copy delay alignment operations is performed for the copy of the multi-destination communication packet.

In other aspects, the inventive subject matter encompasses computer apparatuses and/or computer-readable media configured to carry out the foregoing techniques.

2.0. Structural Overview

FIG. 1A illustrates example aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g., a TCP segment, etc.) to a second node 110 over a path that includes an intermediate node 110. This unit of data may be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g., frames and/or cells, etc.) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the unit of data, a label to attach the unit of data, etc. In cases where multiple paths (e.g., over the same port, over different ports, etc.) to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g., a "five-tuple" combination of a source address, source port, destination address, destination port, and protocol, etc.). A flow is often intended to be sent in sequence, and network devices are therefore typically configured to send all data units within a given flow along a same path to ensure that the flow is received in sequence.

A node 110 may operate on network data at several different layers, and therefore view the same data as belonging to several different types of data units.

2.2. Network Paths

Any node in the depicted network 100 may communicate with any other node in the network 100 by sending data units through a series of nodes 110 and links, referred to as a path. For example, Node B (110b) may send data units to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g., which egress port it should send the data unit out on, etc.). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

FIG. 2A illustrates example aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through various subcomponents of the forwarding logic of device 200 is as follows. After being received via a port 210, a data unit 205 may be buffered in an ingress buffer and queued in an ingress queue by an ingress arbiter 220 until the data unit 205 can be processed by an ingress packet processor 230, and then delivered to an interconnect (or a cross connect) such as a switching fabric 270. From the interconnect, the data unit 205 may be forwarded to a traffic manager 240. The traffic manager 240 may store the data unit 205 in an egress buffer and assign the data unit 205 to an egress queue. The traffic manager 240 manages the flow of the data unit 205 through the egress queue until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter which temporally stores or buffers the data unit 205 in a transmit buffer 280 and finally forwards out the data unit via another port 290. Of course, depending on the embodiment, the forwarding logic may omit some of these subcomponents and/or include other subcomponents in varying arrangements.

Example components of a device 200 are now described in further detail.

2.4. Ports

Network device 200 includes ports 210/290. Ports 210, including ports 210-1 through 210-N, are inbound ("ingress") ports by which data units referred to herein as data units 205 are received over a network, such as network 110. Ports 290, including ports 290-1 through 290-N, are outbound ("egress") ports by which at least some of the data units 205 are sent out to other destinations within the network, after having been processed by the network device 200.

As shown in FIG. 2A, egress ports 290 may operate with corresponding transmit buffers 280 to store data units or subunits (e.g., packets, cells, frames, transmission units, etc.) divided therefrom that are to be transmitted through ports 290. Transmit buffers 280 may have one-to-one correspondence relationships with ports 290, many-to-one correspondence with ports 290, and so on. Egress processors 250 or egress arbiters operating with egress processors 250 may output these data units or subunits to transmit buffers 280 before these units/subunits are transmitted out from ports 290.

Data units 205 may be of any suitable PDU type, such as packets, cells, frames, transmission units, etc. In an embodiment, data units 205 are packets. However, the individual atomic data units upon which the depicted components may operate may be actually be subunits of the data units 205. For example, data units 205 may be received, acted upon, and transmitted at a cell or frame level. These cells or frames may be logically linked together as the data units 205 (e.g., packets, etc.) to which they respectively belong for purposes of determining how to handle the cells or frames. However, the subunits may not actually be assembled into data units 205 within device 200, particularly if the subunits are being forwarded to another destination through device 200.

Ports 210/290 are depicted as separate ports for illustrative purposes, but may actually correspond to the same physical hardware ports (e.g., network jacks or interfaces, etc.) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and a separate egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in some operational scenarios, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 230. On the other end, an egress packet processor 250 may input data units serially into another SerDes block, which outputs the data units in parallel to ports 290.

2.5. Packet Processors

A device 200 comprises one or more packet processing components that collectively implement forwarding logic by which the device 200 is configured to determine how to handle each data unit 205 that the device 200 receives. These packet processors components may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 230 and 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 230 and 250 configured to perform any number of processing tasks.

In an embodiment, the packet processors 230 and 250 within a device 200 may be arranged such that the output of one packet processor 230 or 250 may, eventually, be inputted into another packet processor 230 or 250, in such a manner as to pass data units 205 from certain packet processor(s) 230 and/or 250 to other packet processor(s) 230 and/or 250 in a sequence of stages, until finally disposing of the data units 205 (e.g., by sending the data units 205 out an egress port 290, "dropping" the data units 205, etc.). The exact set and/or sequence of packet processors 230 and/or 250 that process a given data unit 205 may vary, in some embodiments, depending on the attributes of the data unit 205 and/or the state of the device 200. There is no limit to the number of packet processors 230 and/or 250 that may be chained together in such a manner.

Based on decisions made while processing a data unit 205, a packet processor 230 or 250 may, in some embodiments, and/or for certain processing tasks, manipulate a data unit 205 directly. For instance, the packet processor 230 or 250 may add, delete, or modify information in a data unit header or payload. In other embodiments, and/or for other processing tasks, a packet processor 230 or 250 may generate control information that accompanies the data unit 205, or is merged with the data unit 205, as the data unit 205 continues through the device 200. This control information may then be utilized by other components of the device 200 to implement decisions made by the packet processor 230 or 250.

In an embodiment, a packet processor 230 or 250 need not necessarily process an entire data unit 205, but may rather only receive and process a subunit of a data unit 205 comprising header information for the data unit. For instance, if the data unit 205 is a packet comprising multiple cells, the first cell, or a first subset of cells, might be forwarded to a packet processor 230 or 250, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 230 or an egress packet processor 250. Generally, an ingress processor 230 resolves destinations for a traffic manager 240 to determine which ports 290 and/or queues a data unit 205 should depart from. There may be any number of ingress processors 230, including just a single ingress processor 230.

In an embodiment, an ingress processor 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 230 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 or corresponding transmit buffers 280 for the ports 290 may be regulated via an egress arbiter coupled to the egress packet processor 250. In some embodiments, an egress processor 250 may also or instead be coupled to other potential destinations, such as an internal central processing unit, a storage subsystem, or a traffic manager 240.

2.6. Buffers

Since not all data units 205 received by the device 200 can be processed by component(s) such as the packet processor(s) 230 and/or 250 and/or ports 290 at the same time, various components of device 200 may temporarily store data units 205 in memory structures referred to as (e.g., ingress, egress, etc.) buffers while the data units 205 are waiting to be processed. For example, a certain packet processor 230 or 250 or port 290 may only be capable of processing a certain amount of data such as a certain number of data units 205, or portions of data units 205, in a given clock cycle, meaning that other data units 205, or portions of data units 205, destined for the packet processor 230 or 250 or port 290 must either be ignored (e.g., dropped, etc.) or stored. At any given time, a large number of data units 205 may be stored in the buffers of the device 200, depending on network traffic conditions.

A device 200 may include a variety of buffers, each utilized for varying purposes and/or components. Generally, a data unit 205 awaiting processing by a component is held in a buffer associated with that component until the data unit 205 is "released" to the component for processing.

Buffers may be implemented using any number of distinct banks of memory. Each bank may be a portion of any type of memory, including volatile memory and/or non-volatile memory. In an embodiment, each bank comprises many addressable "entries" (e.g., rows, columns, etc.) in which data units 205, subunits, linking data, or other types of data, may be stored. The size of each entry in a given bank is known as the "width" of the bank, while the number of entries in the bank is known as the "depth" of the bank. The number of banks may vary depending on the embodiment.

Each bank may have associated access limitations. For instance, a bank may be implemented using single-ported memories that may only be accessed once in a given time slot (e.g., clock cycle, etc.). Hence, the device 200 may be configured to ensure that no more than one entry need be read from or written to the bank in a given time slot. A bank may instead be implemented in a multi-ported memory to support two or more accesses in a given time slot. However, single-ported memories may be desirable in many cases for higher operating frequencies and/or reducing costs.

In an embodiment, in addition to buffer banks, a device may be configured to aggregate certain banks together into logical banks that support additional reads or writes in a time slot and/or higher write bandwidth. In an embodiment, each bank, whether logical or physical or of another (e.g., addressable, hierarchical, multi-level, sub bank, etc.) organization structure, is capable of being accessed concurrently with each other bank in a same clock cycle, though full realization of this capability is not necessary.

Some or all of the components in device 200 that utilize one or more buffers may include a buffer manager configured to manage use of those buffer(s). Among other processing tasks, the buffer manager may, for example, maintain a mapping of data units 205 to buffer entries in which data for those data units 205 is stored, determine when a data unit 205 must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit 205 is received as, or divided into, constituent data unit portions for storage purposes. The buffers may store these constituent portions separately (e.g., not at the same address location or even within the same bank, etc.). The one or more buffer entries in which a data unit 205 are stored are marked as utilized (e.g., in a "free" list, free or available if not marked as utilized, etc.) to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to banks and/or specific entries within those banks randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different banks may be utilized to store data units 205 received from different ports 210 or sets of ports 210. In an embodiment, the buffer assignment logic also or instead utilizes buffer state information, such as utilization metrics, to determine which bank and/or buffer entry to assign to a data unit 205, or portion thereof. Other assignment considerations may include buffer assignment rules (e.g., no writing two consecutive cells from the same packet to the same bank, etc.) and I/O scheduling conflicts, for example, to avoid assigning a data unit to a bank when there are no available write operations to that bank on account of other components reading content already in the bank.

2.7. Queues

In an embodiment, to manage the order in which data units 205 are processed from the buffers, various components of a device 200 may implement queueing logic. For example, the flow of data units through ingress buffers may be managed using ingress queues while the flow of data units through egress buffers may be managed using egress queues.

Each data unit 205, or the buffer locations(s) in which the data unit 205 is stored, is said to belong to one or more constructs referred to as queues. Typically, a queue is a set of memory locations (e.g., in the buffers, etc.) arranged in some order by metadata describing the queue. The memory locations may (and often are) non-contiguous relative to their addressing scheme and/or physical or logical arrangement. For example, the metadata for one queue may indicate that the queue is comprised of, in order, entry addresses 2, 50, 3, and 82 in a certain buffer.

In many embodiments, the sequence in which the queue arranges its constituent data units 205 generally corresponds to the order in which the data units 205 or data unit portions in the queue will be released and processed. Such queues are known as first-in-first-out ("FIFO") queues, though in other embodiments other types of queues may be utilized. In some embodiments, the number of data units 205 or data unit portions assigned to a given queue at a given time may be limited, either globally or on a per-queue basis, and this limit may change over time.

2.8. Traffic Management

According to an embodiment, a device 200 further includes one or more traffic managers 240 configured to control the flow of data units to one or more packet processor(s) 230 and/or 250. For instance, a buffer manager within the traffic manager 240 may temporarily store data units 205 in buffers as they await processing by egress processor(s) 250. A traffic manager 240 may receive data units 205 directly from a port 210, from an ingress processor 230, and/or other suitable components of device 200. In an embodiment, the traffic manager 240 receives one TDU from each possible source (e.g. each port 210, etc.) each clock cycle or other time slot.

Traffic manager 240 may include or be coupled to egress buffers for buffering data units 205 prior to sending those data units 205 to their respective egress processor(s) 250. A buffer manager within the traffic manager 240 may temporarily store data units 205 in egress buffers as they await processing by egress processor(s) 250. The number of egress buffers may vary depending on the embodiment. A data unit 205 or data unit portion in an egress buffer may eventually be "released" to one or more egress processor(s) 250 for processing, by reading the data unit 205 from the (e.g., egress, etc.) buffer and sending the data unit 205 to the egress processor(s) 250. In an embodiment, traffic manager 240 may release up to a certain number of data units 205 from buffers to egress processors 250 each clock cycle or other defined time slot.

Beyond managing the use of buffers to store data units 205 (or copies thereof), a traffic manager 240 may include queue management logic configured to assign buffer entries to queues and manage the flow of data units 205 through the queues. The traffic manager 240 may, for instance, identify a specific queue to assign a data unit 205 to upon receipt of the data unit 205. The traffic manager 240 may further determine when to release—also referred to as "dequeuing"—data units 205 (or portions thereof) from queues and provide those data units 205 to specific packet processor(s) 250. Buffer management logic in the traffic manager 240 may further "deallocate" entries in a buffer that store data units 205 are no longer linked to the traffic manager's queues. These entries are then reclaimed for use in storing new data through a garbage collection process.

In an embodiment, different queues may exist for different destinations. For example, each port 210 and/or port 290 may have its own set of queues. The queue to which an incoming data unit 205 is assigned and linked may, for instance, be selected based on forwarding information indicating which port 290 the data unit 205 should depart from. In an embodiment, a different egress processor 250 may be associated with each different set of one or more queues. In an embodiment, the current processing context of the data unit 205 may be used to select which queue a data unit 205 should be assigned to.

In an embodiment, there may also or instead be different queues for different flows or sets of flows. That is, each identifiable traffic flow or group of traffic flows is assigned its own set of queues to which its data units 205 are respectively assigned. In an embodiment, different queues may correspond to different classes of traffic or quality-of-service (QOS) levels. Different queues may also or instead exist for any other suitable distinguishing properties of the data units 205, such as source address, destination address, packet type, and so forth.

Device 200 may comprise any number (e.g., one or more, etc.) of packet processors 230 and/or 250 and traffic managers 240. For instance, different sets of ports 210 and/or ports 290 may have their own traffic manager 240 and packet processors 230 and/or 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 230 or 250 for any number of intermediate stages. The data unit 205 may thus pass through any number of traffic managers 240 and/or packet processors 230 and/or 250 prior to exiting the system 200. In other embodiments, only a single traffic manager 240 is needed. If intermediate processing is needed, flow of a data unit 205 may "loop back" to the traffic manager 240 for buffering and/or queuing after each stage of intermediate processing.

In an embodiment, a traffic manager 240 is coupled to the ingress packet processor(s) 230, such that data units 205 (or portions thereof) are assigned to buffers only upon being initially processed by an ingress packet processor 230. Once in an egress buffer, a data unit 205 (or portion thereof) may be "released" to one or more egress packet processor(s) 250 for processing, either by the traffic manager 240 sending a link or other suitable addressing information for the corresponding buffer to the egress packet processor 250, or by sending the data unit 205 directly.

In the course of processing a data unit 205, a device 200 may replicate a data unit 205 one or more times for multi-destination purposes such as, without limitation, multicasting, mirroring, recirculation, debugging, and so forth. For example, a single data unit 205 may be replicated to multiple egress queues. For instance, a data unit 205 may be linked to separate queues for each of ports 1, 3, and 5. As another example, a data unit 205 may be replicated a number of times after it reaches the head of a queue (e.g., for different egress processors 250, etc.). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual copy of the data unit 205 in buffers, or a single copy of the data unit 205 may be linked from a single buffer location to multiple queues at the same time.

2.9. Forwarding Logic

The logic by which a device 200 determines how to handle a data unit 205—such as where and whether to send a data unit 205, whether to perform additional processing on a data unit 205, etc. —is referred to as the forwarding logic of the device 200. This forwarding logic is collectively implemented by a variety of the components of the device 200, such as described above. For example, an ingress packet processor 230 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 230 performs edits as well.

The forwarding logic may be hard-coded and/or configurable, depending on the embodiment. For example, the forwarding logic of a device 200, or portions thereof, may, in some instances, be at least partially hard-coded into one or more ingress processors 230 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g., are directed to, etc.) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g., utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers are overutilized, a queue is over a certain size, and/or a data unit 205 has a certain characteristic.

2.10. Multi-Destination Enqueuing and Dequeuing

Figure 2B:
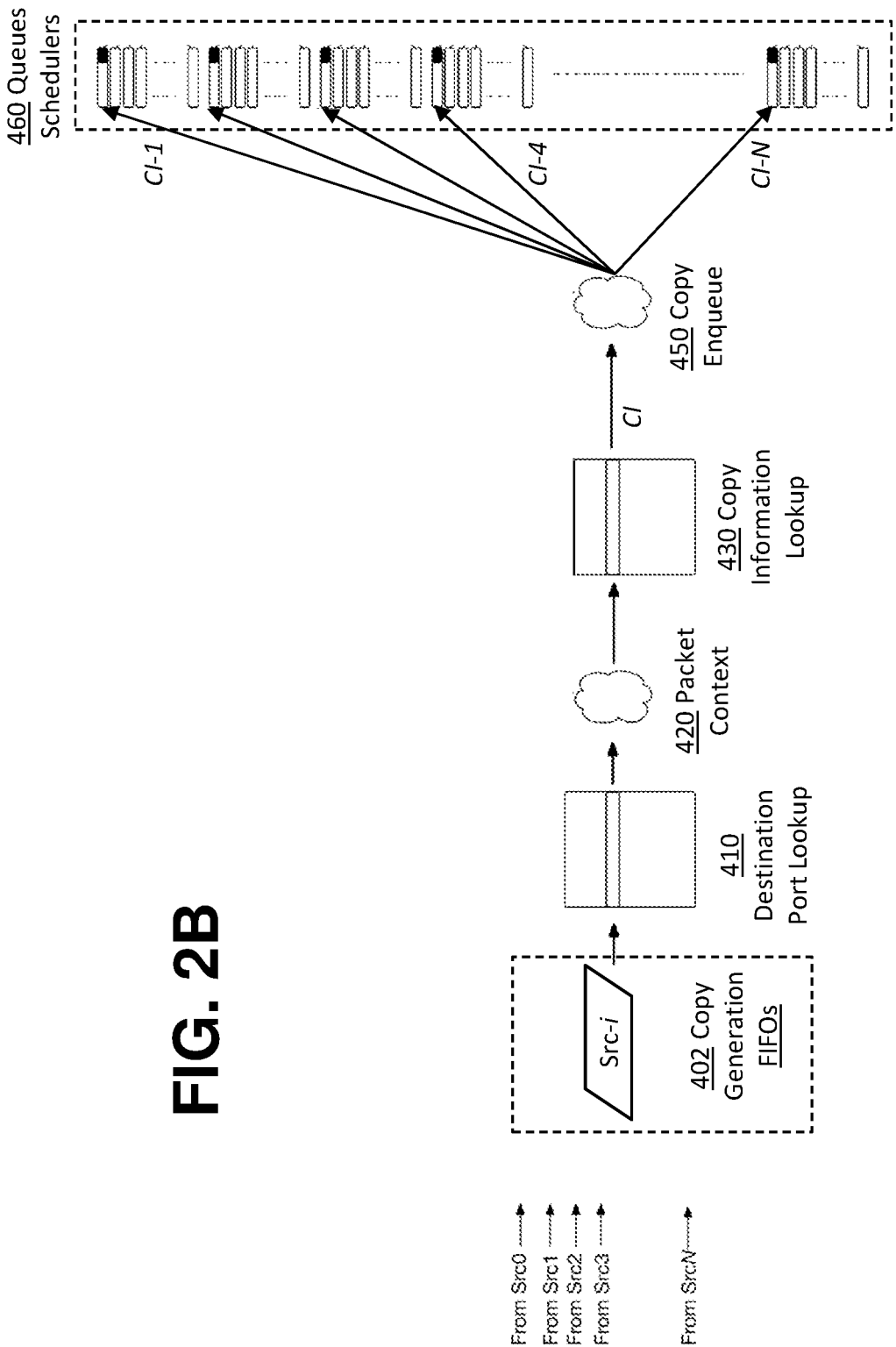

FIG. 2B illustrates example multi-destination enqueuing operations that link packets and/or copies thereof to queues of egress ports in multi-destination packet delivery applications. As shown, incoming multi-destination packets from sources nodes (denoted as "Src0" . . . "SrcN") are written into one or more copy generation (CG) FIFOs 402. A multi-destination packet (e.g., multi-destination packet, non-multi-destination packet, etc.) can be enqueued into queues of egress ports identified by multi-destination port lookup operations 410 based on a multi-destination group ID to which the packet is associated. The egress ports may represent a subset of egress ports in all egress ports of a network node, as filtered or selected (e.g., using a port bitmap identifying all egress ports for replicating or multi-destination delivery, etc.) based at least in part on a determination of whether an egress port belongs to the multi-destination group as identified by the multi-destination group ID. Packet metadata or context 420 may be generated and used by subsequent multi-destination dequeuing operations to look up sets of destinations (e.g., destination IP addresses, etc.) or sets of copies to make from the header of a queue of an egress port identified to be in the multi-destination group. Copy information (CI) corresponding to or based on the packet context 420 of the multi-destination packet may be generated by copy information lookup operations 430 for the multi-destination packet. The CI may contain per-queue or per-egress port or per-destination CI portions (denoted as "CI-1" . . . "CI-N") to indicate or specify respective reference counters (or counter values) representing respective total numbers or counts of copies of the multi-destination packet for the corresponding queues of the egress ports identified by the multi-destination port lookup operations 410. Corresponding references or pointers to the per-queue CI portions may be enqueued by copy enqueue operations 450 (including but not limited to queue admission check) into the queues of the egress ports that are managed or scheduled for dequeuing by queue schedulers 460. It should be noted that, in various operational scenarios, multi-destination operations may be used to support normal multicasting applications to deliver packets from a source node to multiple endpoint devices as well as other multi-destination applications such as mirror applications, recirculation applications, and so on.

FIG. 2C illustrates example multi-destination dequeuing operations that generate one or more per-destination (e.g., per-destination-IP-address, etc.) copies of the multi-destination packet referenced by the header of a queue of each egress port identified by the multi-destination enqueuing operations of FIG. 2B. As shown, internal packet metadata such as pointers or references may be dequeued by queue schedulers 460 from headers of queues 480 from the queues of the egress ports identified by the multi-destination enqueuing operations. These pointers or references can be used by copy lookup operations 480 to identify or determine respective copy information (CI) portions for the egress ports. A copy information portion (denoted as "CI-I") for each of the egress ports contains packet or copy specific metadata, specific information, specific commands and/or specific instructions to downstream components such as local or remote ports, local or remote nodes. The CI portion ("CI-I") specifies (e.g., using a reference counter, etc.) how many copies of the multi-destination packet are to be made for the egress port. Additionally, optionally or alternatively, the CI portion ("CI-I") specifies how the multi-destination packet should be specifically modified for the corresponding egress port and/or for a destination or destination IP address to be reached through the egress port. The CI portion ("CI-I") can be used by egress packet processing operations 490 to generate specified copies of the multi-destination packet for each of the egress ports for corresponding destinations or destination IP addresses, to modify these copies as specified in the commands or instructions in the CI portion ("CI-I"), to embed in these copies some or all of the commands or instructions in the CI portion ("CI-I") to be carried out by subsequent packet processing components or network nodes, to forward these copies of the multi-destination packet to the next hop toward the destinations or destination IP addresses, and so on.

2.11. Time Sensitive Communications

Time sensitive communications as described herein refers to delivery of (e.g., multi-cast, broadcast, unicast, etc.) packets from the same source node (which may be referred to as a time-sensitive nexus node) to a plurality of destination nodes (which may be referred to as time-sensitive non-nexus nodes) with path-dependent or path-specific departure eligible times (or DETs) to account for path-dependent or path-specific time latency variations associated with individual (unidirectional) paths from the source node to each destination node in the plurality of destination nodes. In some operational scenarios, as one of multiple possible approaches to align or synchronize packet delivery times, the path-dependent or path-specific DETs may be computed, selected or set based at least in part on measurements or probing results—e.g., through tracing packets, through real-time timestamps inserted in measurement packets, etc. —of the path-dependent or path-specific time latency variations associated with the individual paths, such that a packet from the source node takes the same amount of time—within a specific time budget or error tolerance such as within a fixed time difference among all the destination nodes—to deliver from the source node to a destination node in the plurality of destination nodes and to any other destination node in the plurality of destination nodes.

Additionally, optionally or alternatively, the time sensitive communications may further refer to delivery of (e.g., multi-cast, broadcast, unicast, etc.) packets from a plurality of source nodes (which may be referred to as time-sensitive non-nexus nodes) to the same destination node (which may be referred to as a time-sensitive nexus node) with path-dependent or path-specific DETs to account for path-dependent or path-specific time latency variations associated with individual (unidirectional) paths from each source node in the plurality of source nodes to the same destination node. In some operational scenarios, the path-dependent or path-specific DETs may be computed, selected or set based at least in part on measurements or probing results of the path-dependent or path-specific time latency variations associated with the individual paths, such that a packet from a source node in the plurality of source nodes and a packet from any other source node in the plurality of source nodes take the same amount of time—within a specific time budget or error tolerance such as within a fixed time difference among all the destination nodes—to deliver to the same destination node.

Time sensitive communications between the nexus node and the non-nexus nodes may be implemented with a wide variety of network topologies including but not limited to peer-to-peer networks, master-slave networks, hierarchical networks, and so forth. As used herein, the nexus node refers to a source node or destination node that communicates with a plurality of destination or source nodes—referred to as non-nexus nodes—in a time-sensitive packet delivery framework such that time latencies of packets delivered from the nexus node to the non-nexus nodes or from the non-nexus nodes to the nexus node are equalized within a relatively strict time budget, such as within a fixed number of clock cycles, within 1/10, 1/100 or 1/1000 of the end-to-end transmission time, no more than one nanosecond, no more than 10 nanoseconds, etc.

Figure 1B:
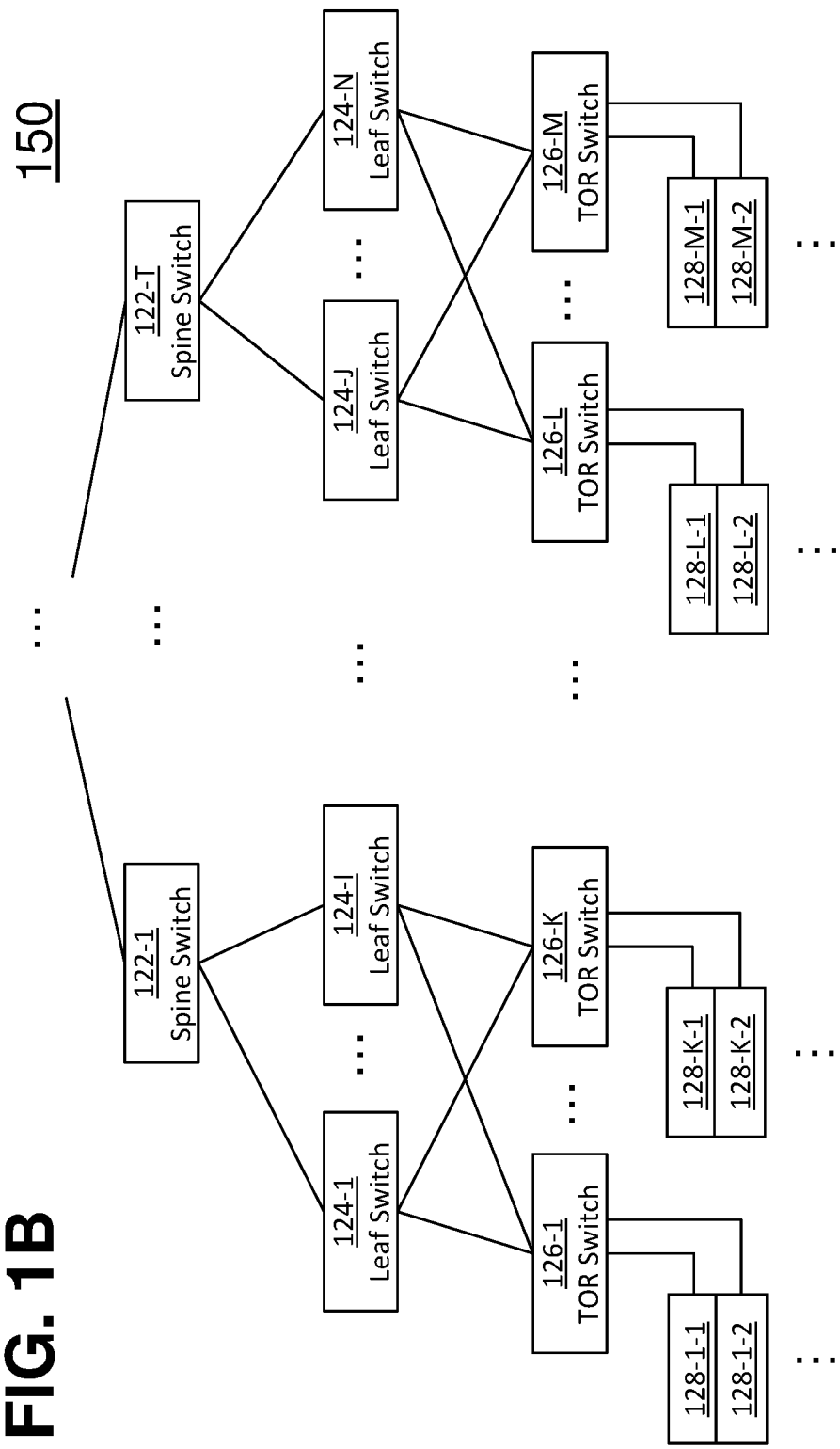

As a non-limiting example, the time sensitive communication framework may be implemented with a hierarchical network 150 as illustrated in FIG. 1B. The hierarchical network 150 may be a part of the networking system 100 of FIG. 1A. The hierarchical network 150 may be deployed or included as a part of one or more delay sensitive computing systems, one or more high performance computing systems, one or more public and/or private network clouds, etc. For example, some or all of the switches (or network elements or nodes) in the time sensitive packet communication framework may be deployed or implemented in one or more data centers.

The nexus node—which may be one of the nodes 110 of FIG. 1A (not shown in FIG. 1B) —can communicate unidirectionally or bidirectionally with each non-nexus node 128 through the hierarchical network 150 of FIG. 1B. As shown in FIG. 1B, non-nexus nodes 128 may be operatively connected or linked with respective top-of-rack (TOR) switches 126 at the lowest level of the network hierarchy. The TOR switches 126 in turn are operatively connected or linked with respective leaf switches 124 at the next lowest level of the network hierarchy. The leaf switches 124 may be operatively connected or linked with spine switches 122 at the next level of the network hierarchy. The spine switches 122 may be operatively connected or linked with further upper layer network elements such as network elements that constitute a core network. The nexus node 110 may be communicated with each non-nexus node 128 through the switches 122, 124 and 126 as well as possibly additional network elements such as those of the core network with which the spine switches 122 are operatively connected or linked.

For the purpose of illustration only, four levels or layers have been depicted in FIG. 1B for the time sensitive communication framework. It should be noted that in other embodiments, more or fewer levels or layers may be used to implement a time sensitive communication framework as described herein. Also, in some operational scenarios, a peer-to-peer network topology or a hybrid network topology composed of two or more portions of different levels or layers may be used to implement a time sensitive communication framework as described herein. In various operational scenarios, these and other network topologies may be used to implement time sensitive communication frameworks as described herein.

2.12. Miscellaneous

Device 200 illustrates only one of many possible arrangements of devices configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100 or a network topology 150.

Furthermore, figures herein illustrate but a few of the various arrangements of memories that may be utilized to implement the described buffering techniques. Other arrangements may include fewer or additional elements in varying arrangements.

3.0. Functional Overview

Described in this section are various example method flows for implementing various features of the systems and system components described herein. The example method flows are non-exhaustive. Alternative method flows and flows for implementing other features will be apparent from the disclosure.

The various elements of the process flows described below may be performed in a variety of systems, including in a device 800 that utilizes some or all of the time sensitive communication mechanisms described herein. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Intrinsic or Inherent Delay Variations

A time sensitive communication framework can be used to transmit and/or receive packets by a nexus node to and/or from non-nexus nodes with path-specific delay variations aligned or compensated. In some operational scenarios, successive packets originated from the nexus node and destined to the non-nexus nodes constitute the same broadcast or (e.g., multicast, non-multicast, etc.) multi-destination stream of application data sent by the nexus node to each of the non-nexus nodes. Under the time sensitive communication framework, the application data can be received by these non-nexus nodes at the same time (or within a strict time budget). Hence, even if there may be inherent time variations for packets to travel different network switches, different network paths, different ports, transmission distances, different communication media, etc., techniques as described herein can be used to compensate these inherent time variations with specifically selected path-specific or path-dependent departure eligible times to make different copies (or different derivative packets) of the same packet originated from the nexus node arrive at the non-nexus nodes at the same time (or within the strict time budget). As a result, under techniques as described herein, inherent disadvantages for non-nexus nodes associated with relatively high inherent delays are avoided, prevented or significantly reduced. For example, under other approaches that do not implement techniques as described herein, a non-nexus node that receives the packet before the other non-nexus nodes can modify the data at the nexus node before the other non-nexus nodes receive the packet, thereby rendering the packet received by the other non-nexus nodes outdated. In contrast, under techniques as described herein, these non-nexus nodes need not to be provided with outdated views or versions of application/server data at the nexus node as compared with other non-nexus nodes associated with relatively low inherent delays.

In some operational scenarios, a (e.g., maximum, average, etc.) data traffic rate at which the nexus node generates the stream of broadcast or multi-destination data is (e.g., much, twice, five times, ten times, etc.) lower than a data transmission/receiving rate of a port of a switch—e.g., an intermediate node between the nexus node and a non-nexus node—as described herein can support. Additionally, optionally or alternatively, in some operational scenarios, there may be little or no other types of data (e.g., non-time-sensitive data or network traffic, etc.) competing for bandwidths of egress ports. Hence, an egress port and egress queue(s) associated with the egress port can accept or receive to-be-transmitted data generated by the nexus node with little to no backlog in the queue(s).

To reduce path-dependent or path-specific intrinsic delay variations, the time-sensitive broadcast or multi-destination data originated from the nexus node may be replicated for broadcast or multi-destination to multiple non-nexus nodes at an intermediate node relatively close (e.g., as close as possible, etc.) to the non-nexus nodes. As a result, path-dependent or path-specific intrinsic delays (or delay portions) up to the intermediate node are the same with no variations up to the intermediate node.

Departure eligible times can be implemented under techniques as described herein to compensate for delay variations after this initial point of replication at the intermediate node for the purpose of eliminating or significantly reducing the delay variations. Some or all of a wide variety of intrinsic (or inherent) delay variations that contribute to the path-specific or path-dependent delay variations may be compensated by the departure eligible times implemented under these techniques. Example delay variations as described herein may include, but are not necessarily limited to only, any of: variations in switching delays incurred by a cross connect or switching fabric (e.g., 270 of FIG. 2A, etc.) that switches traffic or data from ingress packet processors/arbiters of a switch or node to traffic manager or egress packet processors/arbiters of the switch; variations in replication delays associated with or incurred by generating and/or enqueuing multiple (e.g., N, where N is greater than one (1), serially, at least in part in parallel, etc.) copies of a multi-destination packet originated from the nexus node; variations in (transmit buffer-to-port transmission or TX) delays incurred in processing or servicing data buffered in transmit buffers (e.g., 280 of FIG. 2A, etc.) to different egress ports.

As an example of variations in switching delays, in a switch or node as illustrated in FIG. 2A, arriving packets in an ingress port 210 of FIG. 2A may be processed by an ingress packet processor 230 to determine destination egress ports 290 for these packets. Based on the determined egress ports 290, the packets are sent across a switching fabric 270 to different (e.g., distributed, multiple instances of, etc.) traffic managers for processing and transmitting through the determined egress ports 290. A first packet received from an ingress processor 239-1 may be received and switched by the switching fabric 270 to different traffic managers 240-1 through 240-N. Delays incurred by the switching fabric 270 represent switching delays. The switching delays incurred by the switching fabric 270 may vary depending on incoming ingress ports or ingress packet processors, as well as depending on outgoing egress ports and/or traffic managers 240 and/or other egress processing entities.

In a broadcast or multi-destination packet delivery application, copies of the same packet from the same source node (e.g., referred to as "Src-1", etc.) as received via the same ingress port (e.g., 210-1, etc.) and ingress packet processor (e.g., 230-1, etc.) may be sent to different traffic managers 240 through the switching fabric 270. These different copies of the same packet may arrive at different times at the different traffic managers 240 due to internal switching delays associated with or incurred by the switching fabric 270. Hence, delays incurred by sending packets (or copies of packets) from an ingress port 210-1 or an ingress packet processor 230-1 to an egress port 210-N or a traffic manager 240-N may not match delays incurred by sending packets (or copies of packets) from an ingress port 210-1 or an ingress packet processor 230-1 to an egress port 210-1 or a traffic manager 240-1.

To implement specific logic of the switching fabric 270 in a way that these delay variations are eliminated by the specific logic may add extra data structures and hardwired delays, incur a relatively high or prohibitive cost, increase power consumption, incur additional area or size/footprint cost, etc.

Figure 4:
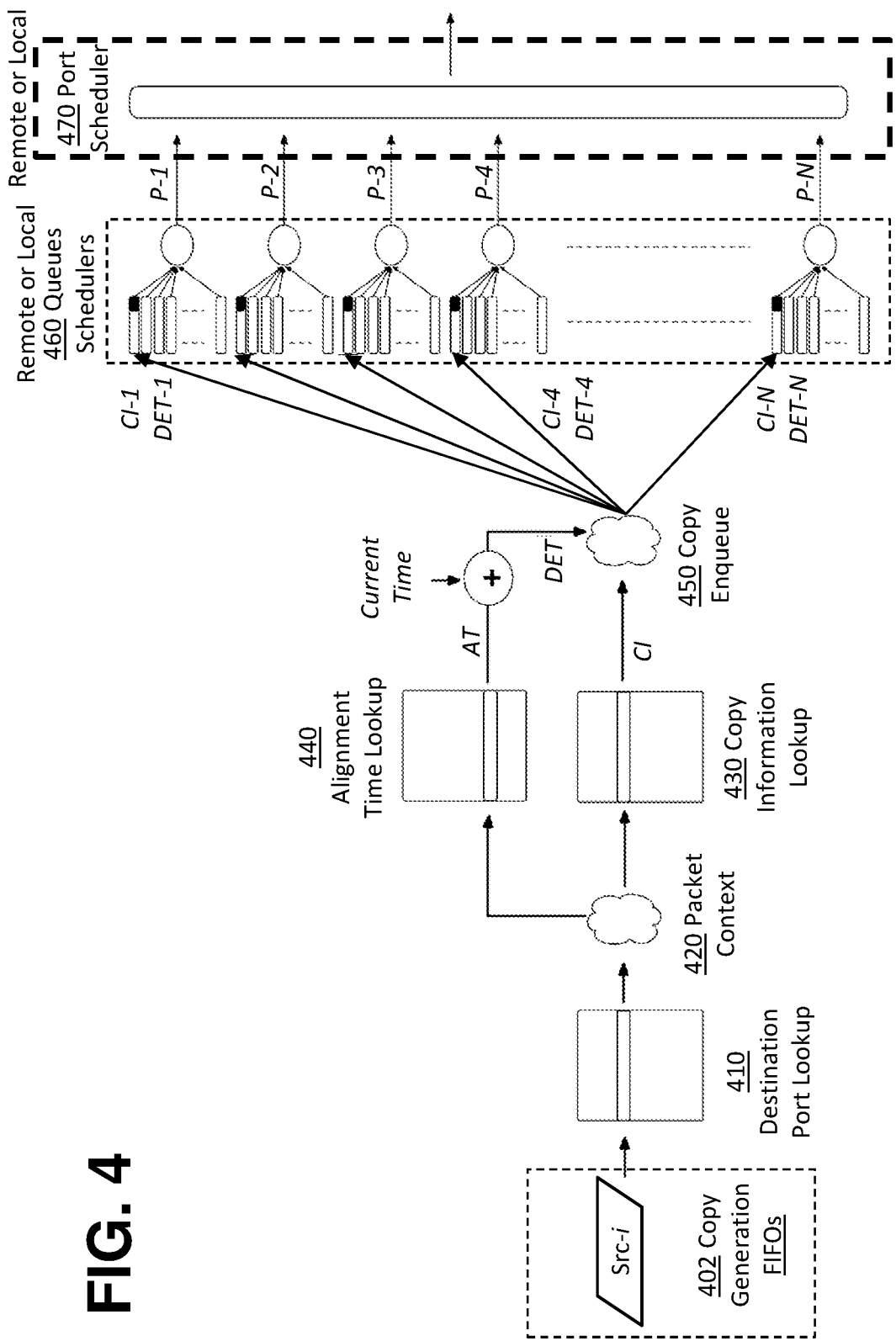
FIG. 4 through FIG. 7 illustrates example delay alignment operations.

As an example of variations in replication delays, as shown in FIG. 4, each multi-destination or broadcast copy of the same (source node) packet (e.g., from a source node denoted as "Src-i") received via the ingress port 210-1 arriving at a traffic manager (e.g., any of 240-1 through 240-N, etc.) may be enqueued into copy generation (CG) FIFOs 402, for example based on a source or ingress port group to which the ingress port 210-1 belongs.

Multi-destination port lookup operations 410 can be performed for the multi-destination or broadcast copy of the same source node packet dequeued from the CG FIFOs 402 based on information provided by the ingress packet processor 230-1 for the multi-destination or broadcast copy of the same source node packet. Table entries produced from the multi-destination port lookup operations 410 can be used to identify egress port(s) for which further copies of the multi-destination or broadcast copy of the same source node packet are to be made.

In some operational scenarios, the traffic manager may avoid duplicating the same information shared by the further copies of the multi-destination or broadcast copy of the same source node packet. For example, some or all of the same information shared by the further copies of the multi-destination or broadcast copy of the same source node packet may be maintained in a single copy of packet context 420. Copy information (or CI) is provided by copy information lookup operations 430 for the same source node packet and enqueued (e.g., with a reference counter indicating how many copies to be made, etc.) into a respective queue associated with each egress port of one or more egress ports in the multi-destination group. On dequeuing (after the copy information lookup operations 430), the CI can be used to indicate or determine how many copies (e.g., through the reference counter, etc.) to make from the head of the respective queue; hence unique per copy information may be generated for destinations or destination addresses looked up based on the egress port when copies of the same source node packet are to be sent or forwarded to the next hop through the egress port toward these destinations or destination addresses. CI can also include unique attributes for each copy that specify the edits to be made to the copy before sending it to the downstream destination.

The traffic manager can be configured to generate and enqueue up to a specific number of different sets of copy information each clock cycle to egress port(s) specified by the multi-destination lookup table entry or entries and/or bound to the traffic manager. In some operational scenarios, the traffic manager may not be able to generate and enqueue different sets of copy information corresponding to all of the further copies of the multi-destination or broadcast copy of the same source node packet in the same clock cycle, but rather generate and enqueue these sets of copy information at least serially in part, thereby generating enqueue delay variations among the different sets of copy information, which represent or correspond to the further copies of the multi-destination or broadcast copy of the same source node packet.

By way of illustration but not limitation, the traffic manager's generation of sets of copy information for the same source node packet begins at the lowest port number among the egress ports identified in a multi-destination group from the multi-destination table port lookup operations 410 and ends at the highest port number in the MC Group. The lower enqueue delays are hence incurred for egress ports assigned lower port numbers as compared with other egress ports assigned higher port numbers.

In addition, enqueue delay variations for different sets of copy information representing metadata, commands or instructions for generating different further copies of the same source node packet exist among different traffic managers. For example, each traffic manager may generate sets of copy information based on its own number of destination egress ports bound to the traffic manager and/or its own multi-destination group. A traffic manager that generates fewer sets of copy information (due to fewer participating egress ports as identified in its multi-destination group) have less total enqueue delays, as compared with another traffic manager that generates more sets of copy information (due to more participating egress ports as identified in the latter's multi-destination group). Additionally, optionally or alternatively, dequeue delay variations for generating different sets of copies of the same source node packet based on different sets of copy information. For example, different numbers or sets of destinations or destination addresses may be associated with different egress ports or queues thereof. Different sets of metadata, commands or instructions may be processed after dequeuing the head of each of the queues of the different egress ports.

To implement specific logic across different traffic managers in a way that these intra-TM and/or cross-TM enqueue delay variations are eliminated by the specific logic may add extra data structures and hardwired delays, incur a relatively high or prohibitive cost, increase power consumption, incur additional area or size/footprint cost, etc.

Figure 3A:
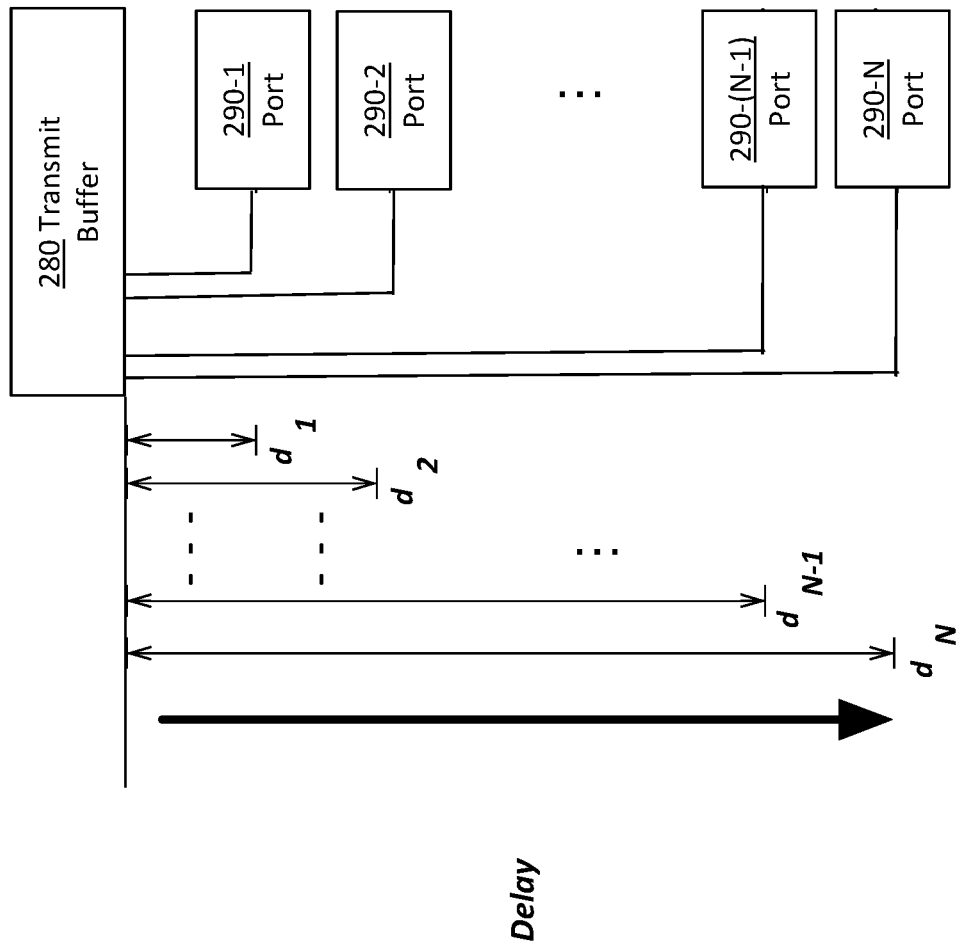
FIG. 3A and FIG. 3C illustrate example delay variations.

As an example of variations in transmit-buffer-to-port-TX delays, as shown in FIG. 3A, physical, electrical or medium related distances (denoted as "$d_1$", "$d_2$", ... "$d_{N-1}$" and "$d_N$", where $d_1 < d_2 < \ldots d_{N-1} < d_N$) from a transmit buffer to individual port logic instances (e.g., MAC, SerDes, etc.) of different egress ports 290-1, 290-2, ... 290-(N-1), 290-N varies. Additionally, optionally or alternatively, delays and delay variations may be incurred by serialization and deserialization performed as a part of providing packets for transmission by egress ports. Hence, packets can depart earlier from the port 290-1 than the port 290-N.

To add staging logic to align delays to each port such that these transmit-buffer-to-port-TX delay variations are eliminated incur a relatively high or prohibitive cost, increase power consumption, incur additional area or size/footprint cost, etc.

3.2. Delay Variation Compensation

In some operational scenarios, a traffic manager can concurrently receive packets originated from multiple sources (or source nodes) in multi-destination or broadcast applications. Packets from each source may be buffered in a respective CG FIFO 402 of FIG. 4 for subsequent replication. It should be noted that the traffic manager may, but is not necessarily limited to only, replicate a multi-destination or broadcast packet as described herein in a logical sense. For example, much of the payload of the packet along with packet context shared by all copies as determined or received by the traffic manager may not be (e.g., physically, actually, etc.) replicated but rather maintained as a single copy in one or more memory buffer entries (or data constructs). For example, only (multiple sets of) copy information or CI per egress port may be generated for all egress ports involved in the multi-destination or broadcast applications as identified by the multi-destination port lookup operations 410 of FIG. 4.

Delay variations—such as fixed or intrinsic delay variations relating to switching fabrics, copy generation, transmission-buffer-to-TX port, and/or other path-specific or path-dependent delay variations—can be compensated by delaying dequeuing operations of different copies of the same source node packet from (local or remote) egress ports or queues associated with the (local or remote) egress ports in a way that equalizes end-to-end delivery of the same source node packet or its copies to multiple time-sensitive packet recipient nodes.

For example, when the same source node packet or a copy thereof is received by a traffic manager and enqueued by the traffic manager for (e.g., further, etc.) replication, for each logical copy (or each distinct set of copy information of the same source node packet to be replicated or generated by the traffic manager to correspond to a respective copy of the same source node packet for a respective egress port identified by the multi-destination port lookup operations 410 of FIG. 4), the traffic manager can assign a specific future time (or time point/instance) for the respective copy of the same source node packet to be eligible for dequeue from the respective egress port. Queueing logic of the respective egress port does not make the copy of the packet eligible for dequeue until the specific future time is satisfied or arrived. The specific future time may be determined or selected by the traffic manager to account for amounts of various delays or delay variations.

In a first example, the traffic manager may determine or select the specific future time to account for enqueue/dequeue related delay variations incurred between the time of arrival or receipt of the same source node packet or a copy thereof at the traffic manager for replication and times of departures or dequeues of copies of the same source node-which copies are (logically) replicated by the traffic manager using the multiple sets of copy information or CI—from respective egress ports identified by the multi-destination port lookup operations 410 of FIG. 4, such that these copies are transmitted from the respective egress ports at the same time or within a strict time window to downstream nodes including but not limited to time sensitive recipient nodes.

In a second example, the traffic manager may determine or select the specific future time to account for the enqueue/dequeue related delay variations, some or all prior delay variations before the enqueue/dequeue related delay variations incurred by the traffic manager and/or queuing logic of egress ports, and/or some or all subsequent delay variations after the enqueue/dequeue related delay variations incurred by the traffic manager and/or queuing logic of egress ports. These prior and/or subsequent delay variations may include, but are not necessarily limited to only, any, some or all of switching fabric delay variations, replication delay variations, enqueue/dequeue delay variations (e.g., incurred by processing logic or traffic managers of other nodes, etc.), transmit buffer-to-port TX delay variations (e.g., incurred by processing logic or egress ports of other nodes, etc.), ingress-port-to-ingress-buffer delay variations, etc.

In some operational scenarios, instead of performing (e.g., local, etc) actual compensation operations by a node for (e.g., local, etc.) delay variations incurred in the node in connection with copies of the same source node packet exiting from local egress ports of the node, the node may indicate amounts of delay variation compensation (times) within the copies of the same source node packet, for example by performing an encapsulation operation such that additional header information is provided with the packet to specify or indicate the future departure time or modifying a partial region of a packet or copy to specify or indicate the future departure time. Hence, the node can avoid performing the actual compensation operations with the local egress ports, and defer the actual delay variation compensation operations to subsequent node(s) or egress ports thereof-which are remote to the former node. Additionally, optionally or alternatively, an earlier or precedent node may anticipate some or all delay variations that will be incurred by subsequent node(s) and perform the actual delay variation compensation operations to account for these anticipated delay variations with egress ports of the earlier or precedent node-which are remote to the subsequent node(s).

3.3. Copy Generation Dataflow

As noted, in some operational scenarios, a traffic manager 240 of FIG. 2A can concurrently receive packets for replication that are originated from multiple sources. The traffic manager 240 can buffer the received packets in a multi-destination traffic flow in CG FIFO(s) 402 of FIG. 4. Arbitration can be performed by the traffic manager 240 or a specific arbiter operating in conjunction with the traffic manager 240 to determine the next packet(s) in the CG FIFO(s) 402 to be replicated. These received packets may be a part of a traffic such as a multi-destination traffic flow. Example multi-destination traffic flows as described herein may include, but are not necessarily limited to only, multicast traffic flows. In some operational scenarios, a multi-destination traffic flow as described herein may be a non-multicast traffic flow. In contrast with a multicast traffic flow, such a non-multicast multi-destination traffic flow can include more than one (e.g., multi-destination, etc.) group id. Additionally, optionally or alternatively, multi-destination traffic flows as described herein can include ingress packet mirroring, where the ingress port makes multiple copies of the packet. Multi-destination traffic flows as described herein can also include egress packet mirroring, where the egress port makes multiple copies of the packet. In addition to or in place of forwarding packets in a multi-destination traffic flow to multiple destinations, some or all of these packets in the multi-destination traffic flow may be copied to a CPU operating (e.g., but not directly involved in a packet processing path or pipeline, etc.) in a network node. For example, the CPU (or a host processor of the network node) may be collecting telemetry data from these copied packets.

The traffic manager can perform multi-destination port lookup operations 410 for each of the received packets and resolve or determine a set of destinations or corresponding egress ports for the received packet, for example, depending on a specific replication or copy type (e.g., non-multicast multi-destination, multicast multi-destination, mirror, recirculation, etc.) of the received packet. The traffic manager 240 can (e.g., logically, not physically duplicating some or all common or shared packet data, etc.) generate multiple sets of copy information (CI) corresponding to multiple egress ports as identified by multi-destination port lookup operations 410 while maintaining a single copy of shared packet data and/or packet context generated or received by the traffic manager 240.

Each set of CI may include some or all resolved or determined per copy information for a (further) copy of the received packet when the head of a queue associated with an egress port is dequeued. Each set of CI along with the shared packet data and/or packet context logically represent a (e.g., further, etc.) replicated copy of the same received packet. A set of CI for a copy of the received packet can be used along with the shared packet data and/or the packet context to generate an actual copy of the received packet. The egress ports can subsequently transmit or forward copies of the received packet—which are corresponding to or derived from the multiple sets of CI in combination of the shared packet data and/or the packet context—to the next nodes or next hops.

3.4. Per Copy Delay Alignment

As illustrated in FIG. 4, per copy delay alignment may be applied along with copy generation performed by a processing entity such as a traffic manager 240 of FIG. 2A. As shown, alignment time lookup operations 440 may be implemented or performed for each (e.g., further, logical, etc.) copy of the received packet to provide or determine an applicable amount of (delay) alignment time (AT) specific for that copy. For example, the applicable amount of AT for each such copy may be looked up based on the source address and/or a destination address for the copy within a given network switch or over one or more hops up to end-to-end from the time-sensitive nexus node to a time-sensitive non-nexus node. Additionally, optionally or alternatively, the applicable amount of AT for each such copy may be looked up based on a logical source address and/or a logical destination address for the copy within a given network switch or over one or more hops between the time-sensitive nexus node and a time-sensitive non-nexus node.

In some operational scenarios, transmissions of copies of the same source node packet to some or all time-sensitive recipient devices or the next hops can be aligned locally through egress ports local to the network device 200 of FIG. 2A. AT information such as the amount needed to account for some or all of: delay variations before the network device 200, delay variations before the traffic manager but within the network device 200, delay variations (e.g., only, to be aggregated with other delay variations, etc.) incurred by the traffic manager and/or egress ports associated with the traffic manager, anticipated delay variations in subsequent paths/ links after the network device 200, and so forth.

In some operational scenarios, egress ports local to the network device 200 of FIG. 2A can carry out some or all (e.g., actual, etc.) alignment operations based on the AT information on (e.g., time-synchronous, near time-synchronous, etc.) transmissions of copies of the same source node packet to some or all time-sensitive recipient devices or the next hops.

In some operational scenarios, egress ports local to the network device 200 of FIG. 2A avoid carrying out (e.g., actual, etc.) alignment operations based on the AT information on (e.g., time-synchronous, near time-synchronous, etc.) transmissions of copies of the same source node packet to some or all time-sensitive recipient devices or the next hops. Rather, the alignment operations are deferred to a different network device 200 before or after the network device 200. For example, the different network device 200 may determine AT information based on alignment time lookup operations, based on previous delay variation measurements or analyses, based on received AT information embedded or indicated in a received packet, etc.

For example, egress ports in the different network device 200 remote to the network device 200 may carry out some or all (e.g., actual, etc.) alignment operations based on the AT information on (e.g., time-synchronous, near time-synchronous, etc.) transmissions of copies of the same source node packet to some or all time-sensitive recipient devices or the next hops. Additionally, optionally or alternatively, the AT information may include or aggregate amount(s) of delay AT(s) incurred in or determined for the network device 200 that defers the alignment operations, delay AT(s) incurred in or determined for the different network device 200 to which the alignment operations are deferred, other delay AT(s) to account for other network devices, links, paths, etc.

An AT as described herein may include or specify an amount of dequeue delay time that a copy of the received packet is to experience or implement in order to (e.g., substantially, within a relatively small time window, within an error tolerance, etc.) align transmissions across two or more egress ports from which two or more copies of the received packet are to be transmitted. The amount as specified by the AT may be configurable by a system or device as described herein and/or by a designated user. The AT may be individual alignment for an individual packet processing entity or aggregated alignment for multiple packet processing entities. The AT may be determined by a single alignment time lookup operations 400 or multiple alignment time lookup operations 400. For example, a alignment time lookup operation 400 may be based on a combination of device source and destination port for a particular copy.

In some operational scenarios, an amount of time indicated in an AT as described herein may represent or cover a worst case delay variation (e.g., 100%, 95% or another percentile of the very worst case delay variation, for example caused by various processing entities. The amount of time may cover or include: variations in switching delays, variations in multi-destination enqueue delays, delay variations incurred in enqueuing other multi-enqueue traffic (e.g., mirror, CPU, etc.), variations incurred in transmit buffer to (egress) port TX delays, variations incurred in transmission delays after egress ports, etc. Specific or individual ATs can be set to specific values or amounts for different sources, different devices, different links, different paths, etc.

As shown in FIG. 4, a specific AT for a specific copy of the received packet can be combined with or added to an applicable current time—for example, at which the received packet or copy thereof is dequeued from the CG FIFO(s) 402 by the traffic manager 240—for the received packet to generate or resolve into a specific time in future at which the specific copy is (eligible) to be dequeued by a local or remote egress port to a time-sensitive recipient device or the next hop. This specific time may be referred to as per copy (or copy specific) departure eligible time (DET), before which the copy is not (eligible) to be dequeued by the local or remote egress port that performs actual alignment operations with respect to the copy.

The local or remote egress port may keep its own current time using a local or remote clock source that is the same as or that is synchronized to a clock source used by the network device 200 that sets the AT or DET used to dequeue the copy. These clock source can time synchronized using one or more standard-based or proprietary clock synchronization protocols. The copy of the received packet may be eligible for scheduling (to be exited out of the egress port from the transmit buffer used by the egress port) or for transmission when the current time>=the per-copy or copy specific DET.

Per-copy DETs as described herein may be different and set based on a number of factors including but not limited to different combinations of source port of a network device receiving the received packet or a copy thereof, destination port of the same or different network device transmitting a specific copy. These per-copy or copy specific DETs may be used to align or dequeue corresponding copies of the received packet at a specific time in future that align transmissions of the copies to their respective time-sensitive recipient devices or the next hops.

In some operational scenarios, as illustrated in FIG. 4, the network device 200 may include copy enqueuing logic 450 that operate with queue schedulers 460 to carry out dequeuing copies of the received packet to transmit buffers (not shown in FIG. 4) of egress ports. A port scheduler 470 operates with the egress ports or the transmit buffers to further dequeue these copies to the time-sensitive recipient devices or the next hops. This helps facilitate (further) actual packet or copy alignment operations, for example performed by local or remote egress ports or their dequeuing logics.

In a non-limiting example, as shown in FIG. 4, a first copy (corresponding to CI-1) of the received packet may have a first dequeue equalization time (denoted as "DET-1") to compensate for a relatively large or largest switch delay (or with the largest delay variation relative to the average or minimum delay). As a result, the first copy (P-1 corresponding to CI-1 and DET-1) departs from the queue schedulers 460 to a first transmit buffer of a first port first in accordance with the first dequeue equalization time (DET-1).

In comparison, a N-th copy (corresponding to CI-N) of the received packet may have a N-th dequeue equalization time (denoted as "DET-N") to compensate for a relatively small or smallest switch delay (or with the smallest delay variation relative to the average or minimum delay). As a result, the N-th copy (P-N corresponding to CI-N and DET-N) departs from the queue schedulers 460 to a N-th transmit buffer of a N-th port last in accordance with the N-th dequeue equalization time (DET-N).

3.5. Egress Port Dequeue Alignment

Figure 5:
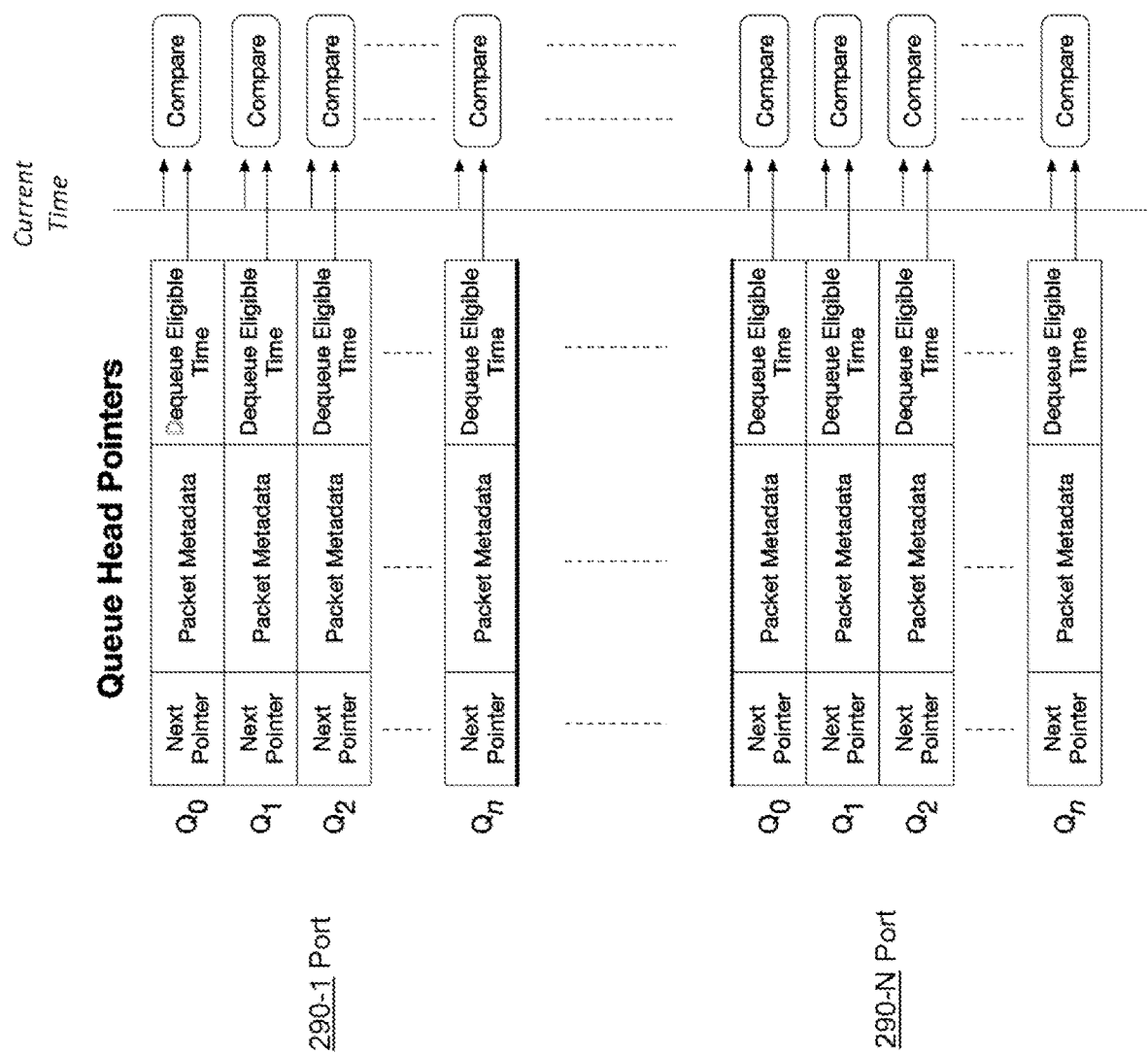

FIG. 5 illustrates example delay alignment operations performed with egress ports (290-1 and/or other egress ports) based on departure eligible times (DETs) provided for copies (e.g., logically represented by CIs or by different sets of CI, etc.) of the same source node packet.

In some operational scenarios, the egress ports and/or their queue schedulers (460 of FIG. 4) and port scheduler (470 of FIG. 4) may be located locally within the same network device 200 that contains copy information lookup operations 430, copy alignment time lookup operations 440, and/or copy enqueuing logic 450 used to determine (delay) alignment time (ATs) and/or departure eligible times (DETs) for these copies of the same source node packet.

In some operational scenarios, the egress ports and/or their queue schedulers (460 of FIG. 4) and port scheduler (470 of FIG. 4) may be located remotely in different network device 200, from the network device 200 that contains copy information lookup operations 430, copy alignment time lookup operations 440, and/or copy enqueuing logic 450 used to determine (delay) alignment time (ATs) and/or departure eligible times (DETs) for these copies of the same source node packet. The network device 200 may set and signal ATs or DETs in the copies of the same source node packet and defer the actual delay alignment operations to subsequent network elements or devices. These copies or the ATs or DETs therein may be received by the different network device 200. The different network device 200 may in turn generate new aggregated ATs or DETs by add further ATs or DETs to the signaled ATs or DETs, and further the actual delay alignment operations to subsequent network elements or devices. Additionally, optionally or alternatively, the different network device 200 can use the signaled ATs or DETs as well as its own portions of ATs or DETs to carry out the delay alignment operations.

As shown in FIG. 5, an egress port 290-1 may have one or more (e.g., transmit or transmission, port-specific, etc.) queues Q0, Q1, . . . , etc., used to dequeue packets or copies thereof from one or more transmit buffers (280 of FIG. 2A). Each of the queues may contain pointers to packet data in memory of the packets or copies thereof to be transmitted by or via the egress port 290-1. These queue head pointers in the queues may include queue head pointers that point to a subset of the packets or copies thereof that are to be next transmitted before other packets or copies thereof pointed to by other pointers (or non-queue-head pointers).

As shown, each queue head pointer may include: per queue linking information such as a reference "next pointer" that may reference or directed at a pointer immediately following that queue head pointer in the same queue; packet metadata that may be used in or by egress transmission operations; a departure eligible time (DET) for the packet or copy thereof pointed to by that queue head pointer; etc.

Egress port logic (460 of FIGS. 4 and/or 470 of FIG. 4) for packet transmission can use the DET and the current time accessible to or used by the egress port 290-1 to determine when the queue or the packet or copy thereof pointed to by the queue head point is eligible (e.g., to be scheduled, etc.) for egress portion transmission. The queue or the packet or copy thereof pointed to by the queue head pointer is eligible for dequeue or for the egress port 290-1 to transmit if the condition (the DET>=the Current Time) is satisfied. Additionally, optionally or alternatively, an alternative condition (the DET>the Current Time) may be used instead of the condition (the DET>=the Current Time). Additionally, optionally or alternatively, packets or copies of packets that are not subject to delay alignment may be determined to be eligible without satisfying the foregoing condition and, for example, may be transmitted on the first come first serve basis.

The current time refers to a time, contemporaneous (o the above discussed egress port dequeuing operations, as indicated by an applicable clock source used by the egress port 290-1 or the network device 200 containing the egress port 290-1. The clock source may be synchronized within or applicable to all processing entities in the network device 200 and/or with other clock sources of other preceding or subsequent network devices 200.

3.6. Alignment Covering Different Types of Delay Variations

Figure 3B:
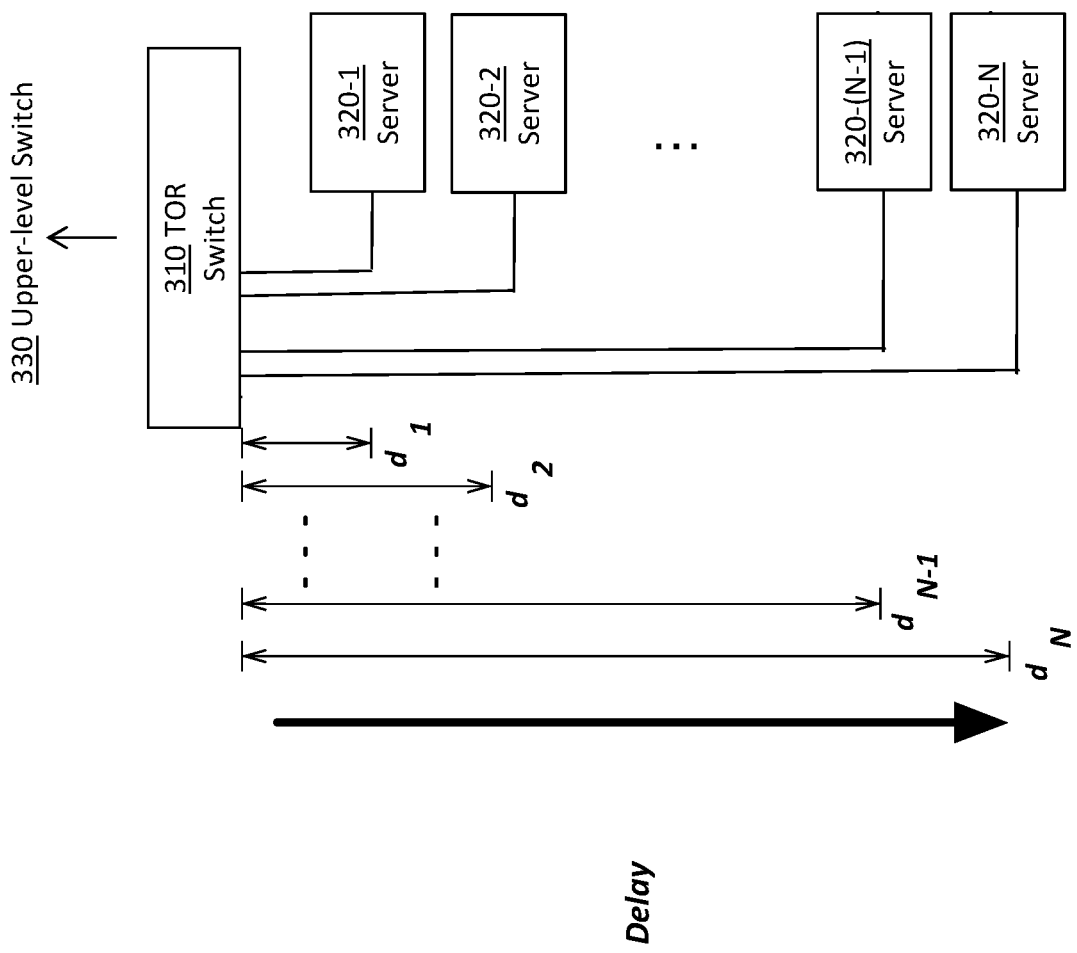

As an example of variations in transmission delays between a first network device and a plurality of second network devices, as shown in FIG. 3B, a top-of-rack switch 310 may communicatively link with individual time-sensitive servers 320 and an upper level switch 330. Physical, electrical or medium related distances (denoted as "$d_1$", "$d_2$", . . . "$d_{N-1}$" and "$d_N$", where $d_1 < d_2 < \ldots d_{N-1} < d_N$) from the top-of-rack switch 310 to the individual time-sensitive servers 320 varies. For example, the server 320-1 may receive its copy of the same source node packet from the top-of-rack server 310 at an earlier time than a later time when the service 320-N receives its respective copy, even if these copies are transmitted out of egress ports of the top-of-rack switch 310 at the same time.

Delay alignment times (ATs) and/or departure eligible times (DETs) as described herein can be used to account for not only some or all delay variations within a network device 200 including but not limited transmit-buffer-to-Port TX as illustrated in FIG. 3A but also additional delay variations outside of the network device 200 including but not limited to transmission delay variations as illustrated in FIG. 3B.

These additional delay variations can occur due to, for example, differences in distances, mediums, etc., between a network device 200 such as the TOR switch 310 of FIG. 3B and link partners such as the next hops or time-sensitive communication devices (e.g., clients and/or servers, the servers 320 of FIG. 3B, etc.).

Some of the time-sensitive communication devices may be located in the same data center as the network device 200 that performs some or all of the delay alignment operations, while others of the time-sensitive communication devices may not be located in the same data center as the network device 200. As a result, the former or co-located time-sensitive communication devices may receive or transmit packets faster than the latter or non-co-located time-sensitive communication devices.

For example, transmission delays incurred in transmission through network paths or links may vary based at least in part on types of transmission media used for packet transfers. Delays incurred when a packet is transmitted via electrical cable will be different from optical cable. Additionally, optionally or alternatively, delay variations over the same network paths or links can be dynamic. For instance, delays incurred for packets transmitted via microwave links may vary based on distance, weather, and other parameters.

These additional delay variations can also occur due to, for example, differences among the time-sensitive communication devices in the network or packet processing components involved or used to drive/receive signaling in network paths, links and/or topologies that traverse these different distances to the time-sensitive communication devices.

These additional delay variations can further occur due to, for example, different source nodes. For example, different source nodes may be used to unicast, multi-destination or broadcast the same or different streams of packets to destination node(s). One of the source nodes may be able to send packets or copies thereof to the destination node(s) faster than others of the source nodes to the same destination node(s).

In various operational scenarios, delay alignment amounts such as ATs used with a current time of receiving a to-be-replicated or to-be-further-replicated (e.g., from the same source node, etc.) packet to generate departure eligible times (DETs) can be set by a system or device as described herein automatically, programmatically, and/or at least partly manually with user input. For example, the system and/or a designated user can configure some or all the delay alignment amounts or ATs for different egress ports, network paths, network links, network topologies, next hops, time-sensitive communication devices/servers/clients based in part or in whole on delay variations measured or determined through measurement data collected from actual network traffic or artificially generated network traffic. Delay variations to be compensated through alignment operations as described herein may be determined through packet timestamping mechanisms deployed with some or all network devices or components therein. Timestamps issued to packets (or copies thereof) can be used determine local (e.g., within a device, with a component of the device, etc.) or remote (e.g., to the next hop, to a previous node or component, multiple hops, end-to-end, etc.) delay variations. These packets (or copies thereof) can be used to traverse within a device, with a next hop, over multiple hops, end-to-end, etc., between a source node and a destination.

Delay alignment amounts or ATs associated with network paths or links may be configured to change dynamically based at least in part on time, distance, weather, and other parameters. Some or all of the delay alignment amounts or ATs may increase for some (e.g., egress, ingress, etc.) ports if one or more microwave links used in packet transmission are being affected by weather (e.g. rain, etc.) or other atmospheric conditions. Some or all of the delay alignment amounts or ATs may vary as a function of time of day, for example based on traffic patterns in different times of day, week, month, season, etc. System and/or user configuration of some or all of the delay alignment amounts and ATs can be tunable and/or configurable dynamically based on device-implemented or computer-implemented policies or rules.

In some operational scenarios, alignment to compensate delay variations as described herein may be performed at the "root" (or root node) of a multi-destination or broadcast tree (including the root node and destination nodes and various intermediate nodes in between). In some operational scenarios, alignment to compensate delay variations as described herein may be performed at each hop of the tree whenever a new copy of an original source node packet or an intermediate copy of the original source node packet is generated or to be generated.

For example, the root of the tree may generate copies to its children or child nodes that are directly attached. Subsequent or further replicated copies to subsequent nodes or hops may be generated by those directly attached children or child nodes. This may continue from the root node down to leaf nodes (with no children of their own) representing time-sensitive devices, servers, clients, etc.

Delay alignment amounts or ATs may be configured to account for delay variations at each hop to ensure delay variations across copies from the root node to some or all of the leaf nodes are compensated such that all copies simultaneously (e.g., within a strict time budget or difference up to one or more tens of nanoseconds, one or more nanoseconds, one or more sub-nanoseconds, one or more hundreds of nanoseconds, one or more microseconds, etc.) arrive to some or all of the leaf nodes representing a full set of destinations.

3.7. Reducing DET Data Size Through Indirection

Per copy or copy-specific delay alignment as described herein can be used to achieve delay alignment with the lowest latency. For example, ATs or DETs for some or all copies of a received packet may be minimized so long as the DETs of these copies are aligned to the same time (e.g., within a specific time budget, etc.) to be transmitted to next hops or time-sensitive devices. For example, these DETs can be set so that packets represented by these copies only wait for so long as what is required to align transmission across egress ports.

Additionally, optionally or alternatively, per copy or copy-specific delay alignment as described herein can be used to address, account for, compensate, remove or significantly reduce delay variations in and outside a network device 200 that performs some or all operations associated with the delay alignment.

While per copy or copy-specific delay alignment as described herein has these and other advantages, implementing and maintaining a per copy DET for each (e.g., multicast, broadcast, etc.) packet processed by a network device in hardware logics/circuits in part or in whole may incur relatively high area cost.

In some operational scenarios, a data field such as a (e.g., 32-bit, M-bit where M is an integer greater than 0, etc.) DET attribute may be defined or specified in a packet descriptor for a (e.g., each, etc.) packet representing a received packet or a copy thereof.

A network device 200 may maintain or access up to a certain number (e.g., hundreds of thousands, etc.) of packet descriptors for packets processed by the network device 200, even though the network device 200 may have a relatively low total number of (e.g., fewer than 5, 10 or 20, etc.) packets that are buffered in the network device 200 at any given time.

To reduce costs associated with per copy delay alignment, there is no need for hundreds of thousands of packet descriptors each with departure eligible time attributes. Rather, the total number of packets that that DET attributes in corresponding packet descriptors can be reduced to accommodate up to a ceiling number (e.g., much, 10,000 times, 1000 times, etc.) lower than the total number of packets that can be processed by the network device 200 at any given time.

In some operational scenarios, the network device 200 may maintain a DET memory for indirection or referencing purposes. The DET memory is separate from a designated memory to store packet descriptors of packets. The total number of memory entries (each of which stores a respective DET, for example in 32 bits for nanosecond or sub-nanosecond time resolution or accuracy) can be configured or provided as (e.g., much, 10,000 times, 1000 times, corresponding to 2%, etc.) less than the total number of packets processed by the network device 200 at any given time, which may be less than the total number of packet descriptors stored in the designated memory by the network device 200. Each packet descriptor may include a data field of a size (e.g., 12 bits, etc.) sufficient to address distinctly every DET memory entry in the DET memory.

By way of example but not limitation, the total number of DET memory entries may be n % of the total number of (e.g., one (1) million, etc.) packets supported or processed by the network device 200 at any given time, where n<=100, such as up to N bits. Each packet may include a N+M bit DET memory reference or pointer with N bits to address the DET memory entries (each of which represents a corresponding L-bit DET attribute, where L>N+M) distinctly and M more bits (e.g., 1 bit, etc.) to indicate whether the reference is valid. As a result, there is no need to maintain L bits of DET for each packet processed by the network device 200. Rather, the total number of (N+M)-bit DET memory references or pointers can be supported with the DET memory, thereby significantly reducing or avoiding the need to store numerous L-bit DET attributes in packet descriptors for packets processed by the network device 200, whether such DET attributes are used or not. The total memory size under this indirection approach amounts to (N+M)-bit rather than L-bit DET memory entries in addition to (N+M) bits in each packet descriptor used as reference or pointer.

In response to determining that a packet represented by a copy of the same source node packet is to be delay aligned, a full DET value can be written to an allocated entry in the DET memory, for example when the packet is enqueued into a transmit buffer for transmission through an egress port. An applicable full DET value such as the previously mentioned full DET value can be looked up when a queue head pointer corresponding to the next transmit buffer entry in the transmit buffer—or a packet such as the above mentioned packet—to be dequeued for transmission through the egress port is updated.

In some operational scenarios, packets to or from time sensitive devices or servers may amount to a relatively low rate, which is insufficient to generate backlog or relatively significant backlog if any. Hence, relatively limited DET memory resources are not expected to be an issue as a result. If the total number of DET memory entries is sufficiently large, exhaustion may only occur when queues (e.g., for transmit buffers, etc.) in the network device 200 are backlogged and/or when queuing delay variations associated with these queues are dominant.

Additionally, optionally or alternatively, a special DET pointer address (value) such as zero (0) can be used by the network device (200) for subsequent packets in response to determining that the DET memory becomes exhausted or used completely. These subsequent packets can become immediately eligible for dequeue from transmit buffers in response to determining that these subsequent packets carry the special DET pointer address (value).

Hence, DET memory indirection as described herein can be used to reduce costs associated with delay alignment while still providing relatively high performance in many deployment environments.

3.8. Per Burst Delay Alignment

Using alignment times (ATs) or dequeue eligibility times (DETs) for each copy of the same source node packet incurs area and processing costs. Some or all of these costs are present whether indirection is used or not.

In some operational scenarios, time-sensitive packets may be received, transmitted or delivered at relatively low rates, such as those much (e.g., 20 times, 50 times, 100 times, etc.) lower than receiving and/or transmission rates of ingress and/or egress ports. Consequently, packets or bursts of packets often arrive to empty queues used to schedule ingress and/or egress processing operations associated with the ingress and/or egress ports.

In these operational scenarios in which the queues are largely (e.g., frequently, 99% of times, 95% of times, etc.) empty, instead of allocating or using DET for each copy of the same source node (whether indirection is used or not), a delay alignment operation may be performed with respect to the very first packet—which may be a copy of a received packet from a source node—arriving to an empty queue such as a transmit queue associated with an egress port. This very first packet can be assigned a DET stored for the queue. The DET stored for the queue may be queue specific and may not be assigned on a per packet basis. This DET can be set or reset to its value when the queue transition from non-empty to empty and used to account for some or all delays or delay variations as a DET used in per copy delay alignment as previously discussed. Hence, the very first packet arriving to the queue will be delayed by the DET.

Subsequent packets—which may be subsequent copies of subsequent received packets from the source node—that follow the very first packet and that arrive to the same queue presently in a non-empty state are not assigned a DET value. No DET-based delay alignment operation is performed for these subsequent packets. Rather, once the very first packet is delay aligned, the subsequent packets can be scheduled and transmitted without performing additional delay alignment operation other than the delay alignment operation already performed on the very first packet.

These subsequent packets may experience some delay variations including not limited to shortened delays as compared with the first packet as well as potential delay variation based on different distances from a feed source to time sensitive recipient devices or servers. However, as DETs in this per-burst delay alignment approach are assigned to queues rather than individual packets, area or processing costs can be significantly reduced or avoided. Hence, this per-burst alignment approach may be used in some operational scenarios in which potential delay variations of subsequent packets are relatively small or tolerable.

3.9. Window-Based Delay Alignment

In some operational scenarios, window-based delay alignment operations may be performed in addition to or in place of per-copy alignment and/or per-burst alignment operations. The window-based delay alignment operations may be used to minimize or prevent delay variations that may still exist in the per-burst alignment operations, for example for subsequent packets arriving to non-empty queues, at a relatively low area or processing costs than the per-copy alignment operations (whether indirection is used or not).

Under this approach, each of multiple copies of the same source node packet can be assigned to a specific transmit window—e.g., covering a coarser time resolution or precision of several tens of nanoseconds instead of a relatively high time resolution or precision of nanosecond or sub-nanosecond—that is synchronized across multiple egress ports in one or more network devices. These network devices or the egress ports therein can implement or start the specific time window at a specific synchronized time across all these devices or ports.

The transmit window can be represented by a numeric identifier that specifies or defines a specific time period/duration/interval from a specific start time to a specific end time in the future at which a specific copy of the same source node packet will be eligible for transmission by an assigned egress port. Additionally, optionally or alternatively, additional per-port delay alignment to compensate delay variation related to or incurred by the assigned egress port may be applied or included by the window-based delay alignment operations performed by the assigned egress port. Hence, the copies of the same source node packet are effectively batched and serviced in the future. These window-based alignment operations can be used to ensure these copies to all be eligible for scheduling to transmit or for transmission at specific (synchronized) DETs such that these copies are ultimately received by time sensitive recipient devices or servers at the same or substantially same (synchronized) time within a strict time budget.

Figure 6:
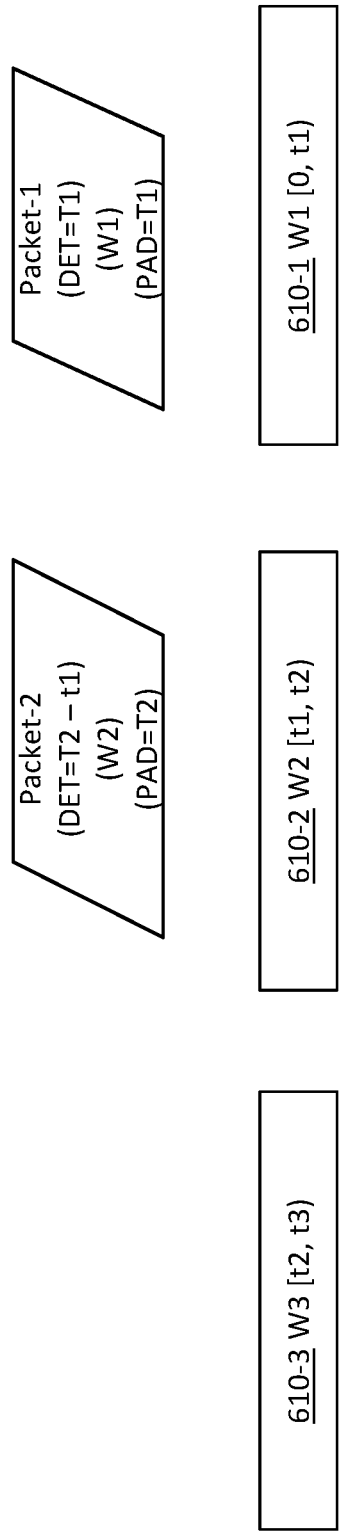

FIG. 6 illustrates example transmit window based delay alignment operations. For the purpose of illustration only, a first packet (denoted as "Packet-1") and a second packet (denoted as "Packet-2") may be copies of the same source node packet and may be assigned to be transmitted by a first egress port and a second egress port of FIG. 4 at a first time window denoted as "W1" covering a time period/interval/duration [0, t1).

As shown, future port transmission time has been partitioned into a plurality of transmit windows. Each transmit window in the plurality of transmit windows represents a time period/interval/duration in a plurality of non-overlapping time periods/intervals/durations. A first transmit window is denoted as "W1" covering a time period/interval/duration [0, t1). A second transmit window immediately following the first transmit window (W1) is denoted as "W2" covering a time period/interval/duration [t1, t2), where t2>t1. A third transmit window immediately following the second transmit window (W2) is denoted as "W3" covering a time period/interval/duration [t2, t3), where t3>t2. Each of these transmit window may be time synchronized across different egress ports such as the first and second egress ports and/or across one or more network devices including these different egress ports.

A DET can be computed for a packet as a sum of a start time of an assigned transmit window and an additional per-port alignment delay (PAD) for an egress port assigned or configured to transmit the packet, as follows:

$$\text{Computed DET}=(\text{Window Start Time})+(\text{Port Alignment Delay}) \quad (1)$$

For example, an additional per-port alignment delay (PAD) of T1, where 0<=T1<t1, has been configured for the first egress port, whereas an additional per-port alignment delay (PAD) of T2, where t1<=T2<t2, has been configured for the second egress port.

Hence, a first DET (DET=T1) can be computed for the first packet (Packet-1) from its assigned transmit window (W1) and PAD (T1) configured for the first egress port, whereas a second DET (DET=T2) can be computed for the second packet (Packet-2) from its assigned transmit window (W1) and PAD (T2) configured for the second egress port.

Since the first transmit window from a start time of 0 to an end time of t1 covers the first DET for the first packet (Packet-1), the first packet will remain in the first transmit window and will be transmitted in the first transmit window at a first time offset of T1. In comparison, since the first transmit window does not cover the second DET for the second packet (Packet-2), the second packet will be deferred to a transmit window that covers the second DET, which in the present example is the second transmit window from t1 to t2 that covers the second DET of T2. The second packet (Packet-2) will be transmitted in the second transmit window at a second time offset of T2-t1 (which is the second DET T2 minus the start time t1 of the second transmit window).

The first and second packets may be transmitted from their respective egress ports after delayed to an applicable transmit window and further delayed to an additional per-port alignment delay.

The window-based delay alignment eliminates delay variations by way of using a numeric value or identifier to specify a specific transmit window that is aligned across egress ports and/or network devices. Assigning these numeric values or identifiers to corresponding time windows can be relatively low cost as compared with using specific DETs—each of which may be at higher time resolution and hence larger than a numeric value or identifier identifying a time window.

The window-based alignment can be extended across multiple egress ports and/or multiple network devices and/or multiple types of transmission media in heterogeneous and/or hierarchical operational environments so long as time is synchronized across these ports and/or devices. As compared with per-copy delay alignment, the window-based alignment may be performed with relatively coarse grained time intervals represented by transmit windows used to represent or cover future time. Additionally, optionally or alternatively, additional delays representing safety margins may be included in the time-based delay alignment to ensure that packets or copies thereof arrive at their egress ports for transmission before their assigned transmit windows already start at any of these egress ports.

3.10. Multi-Hop and/or Last-Hop Delay Alignment

In some operational scenarios, other types of delay alignment operations may be performed as a part of or in addition to or in place of per-copy alignment and/or per-burst alignment operations and/or window-based delay alignment.

Figure 3C:
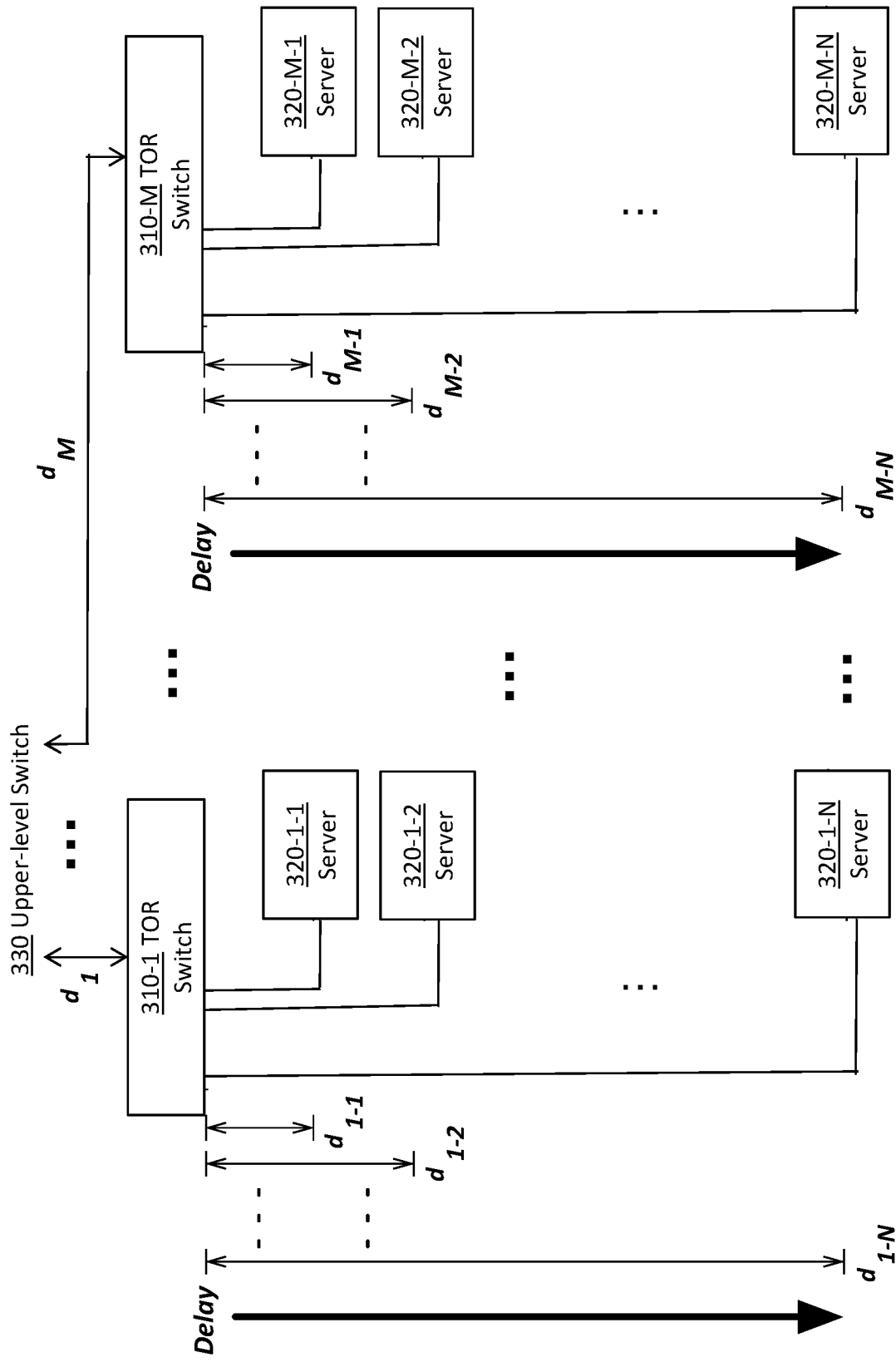

FIG. 3C illustrates example multi-hop delay variations in some or all paths between a time-sensitive nexus node and a plurality of time-sensitive non-nexus nodes or servers 320. For the purpose of illustration only, as shown in FIG. 3C, a plurality of TOR switches 310 may be communicated with the time-sensitive nexus node through an upper-level switch 330 over a plurality of first network links. The upper-level switch 330 may be communicated with the time-sensitive nexus node through other core network elements or nodes not shown in FIG. 3C. Path-, link- or node-specific variations in first-hop delays (denoted as "d1", "d2", . . . "dM") may exist in first hops between the upper-level switch 330 and the plurality of TOR switches 310.

The plurality of TOR switches 310 may be communicated with the time-sensitive non-nexus nodes or servers 320 through a plurality of second network links. Path-, link- or node-specific variations in second-hop delays (denoted as "d1-1", "d1-2", . . . "d1-N" . . . dM-1, dM-2, . . . dM-N) may exist in second hops between the TOR switches 310 and the time-sensitive non-nexus nodes or servers 320.

For example, copies replicated at the upper level switch 330 of a received packet (e.g., from the nexus node, from the core network elements or nodes, etc.) may experience variations in the first hope delays for these copies including but not limited to delay variations in transmitting the copies from the upper level switch 330 to each of the TOR switches 310. In addition, copies further replicated at each of the TOR switches 310 of a received copy from the upper level switch 330 may experience variations in the second hop delays for these further replicated copies including but not limited to delay variations in transmitting the further copies from a TOR switch 310 to each of the time-sensitive non-nexus nodes or servers 320.

Delay alignment operations as described herein may be used to account for or compensate these delay variations across multiple hops. By way of example but not limitation, window-based delay alignment operations may be used to minimize or prevent multi-hop delay variations.

In some operational scenarios, a multi-destination tree may be constructed—e.g., by a root node or network switch that performs replication of a received packet to send copies to next hops and/or to other nodes or network switches or servers, etc. —to represent some or all nodes of a computer network that are involved in multi-destination packets originated from a time-sensitive nexus node to multiple time-sensitive non-nexus nodes. The multi-destination tree may include a root node which replicates and/or forwards one or more copies of a (e.g., received, generated, originated from the nexus node, etc.) packet to the next level nodes in the multi-destination tree. This may be repeated until all leaf nodes of the multi-destination tree receive their respective copies of the packet. For the purpose of illustration only, the leaf nodes are time-sensitive non-nexus nodes that are to receive their respective copies at the same or substantially same time within a relatively strict time budget or window.

In some operational scenarios, the root node can assign a specific transmit window for local and/or remote egress ports of local and/or remote network devices (e.g., the TOR switches 310 of FIG. 3C, etc.) to buffer and transmit all the copies of the packet to the leaf nodes. The specific transmit window may be identified by a logical time value (e.g., a numeric value, etc.) of a clock to which all these network devices or egress ports are time synchronized, for example using time synchronization protocols as specified in IEEE 1588 Precision Time Protocol (PTP). The specific time window can be communicated from the root node to these network devices that are used to perform window-based delay alignment operations via a tag or special packet header in copies of the packet that are transmitted by the root node and received by the network devices. The (downstream) network devices can extract or read information that defines or specifies the specific time window, account for or compensate any additional (e.g., per-port, etc.) alignment delays or PADs, and apply/perform the window-based delay alignment operations.

Some or all of the foregoing delay alignment such as window-based delay alignment may be applicable when some or all network devices involved in setting, communicating or performing delay alignment operations implement corresponding capabilities or processing logics, which may not exist in all environments such as those with heterogeneous sets of network devices that are diverse in terms of vendors, product generations, models, etc.

In some operational scenarios, last hop delay compensation (or alignment) may be used in addition to or in place of some or all of the foregoing delay alignment operations. The last hop delay compensation can be used to align (e.g., upstream, etc.) variations in multi-hop delays and to support a wide variety of heterogenous device environments including but not limited to existing environments already deployed in the field.

Figure 7:
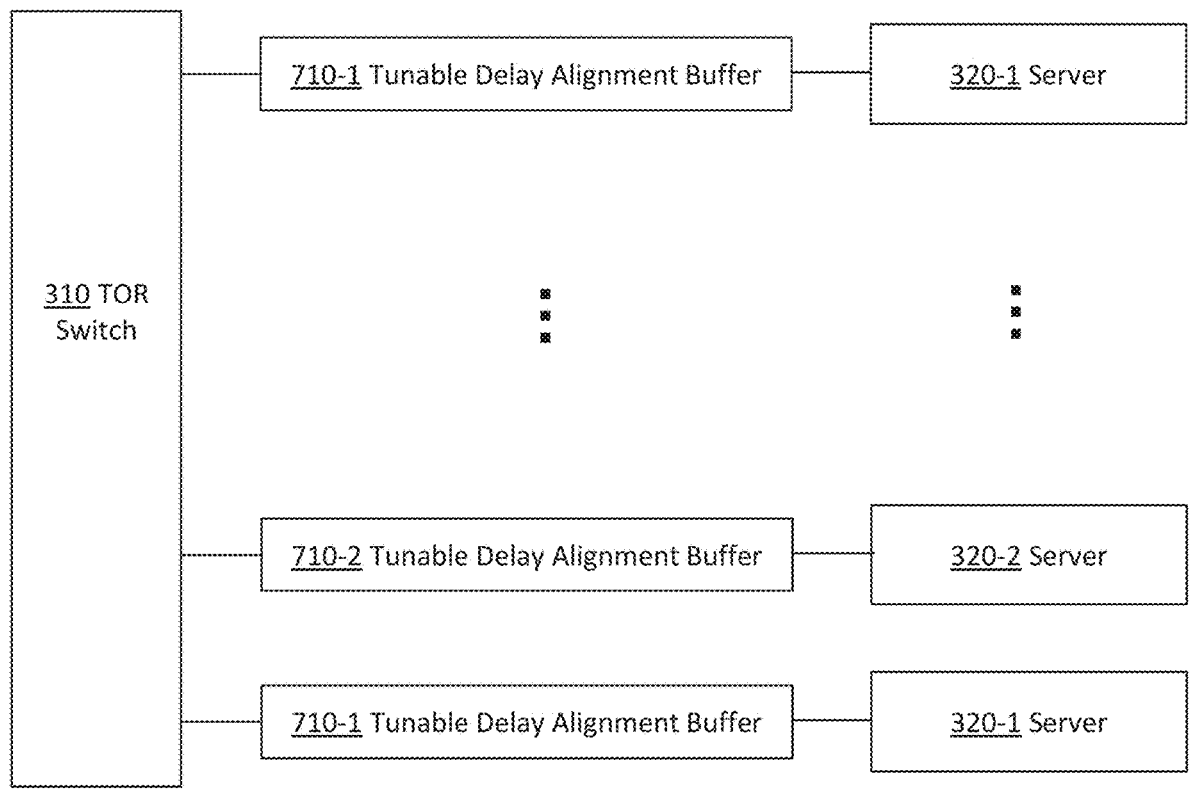

By way of example but not limitation, the last hop is between a TOR switch 310 and a plurality of time-sensitive nodes or servers 320 as shown in FIG. 7. Tunable delay alignment buffers 710 may be deployed in the last hop between the TOR switch 310 and the servers 320. In some operational scenarios, the tunable delay alignment buffers 720 may be used by transmit logic units of egress ports in the TOR switch 310 to perform delay alignment when transmitting copies of the same source node packet from the TOR switch 310 to the servers 320. These copies can be timestamped upon arrival to the transmit logic units. These timestamps can be specified with a single timestamp value in reference to the same global clock if available, for example using a (e.g., proprietary, etc.) alignment scheme based at least in part on knowledge of the delays and transmission times within the system. Additionally, optionally or alternatively, these timestamps can be specified with different timestamp values in reference to different non-global clocks so long as these timestamps refer to the same time point in accordance with a reference clock such as a world clock or a specifically selected non-global clock (e.g., used or referenced by the local clock of the TOR switch 310, etc.) of the different non-global clocks.

Each of these tunable delay buffers 710 may be set with a specific delay amount, for example programmatically and/or manually preconfigured or configured by a designated user and/or by a system/device as described herein. These configured delay amounts at the last hop can be enforced by the transmit logic units operating with the egress ports to enables adjustment or compensation for delay variations across multiple hops including but not limited to delay variations incurred in the last hop. A departure eligible time (DET) for an egress port may be determined by the transmit logic unit through adding a specific delay amount configured for the egress port to a specific timestamp value specified in a respective copy of the same source node packet. The tunable delay buffers 710 stores or maintains copies of the same source node packet for egress ports of the TOR switch 310 and aligns these copies across all the egress ports by holding and delaying these copies for transmission until these copies become eligible for transmission at timepoints specified by their respective DETs.

The tunable delay buffers 710 may be implemented as a part of one of: egress queue and/or port scheduler(s) 460 and 470 of FIG. 4, physical layer or PHY devices/components, GearBox devices/components, MacSec devices/components, etc. Additionally, optionally or alternatively, the tunable delay buffers 710 may be implemented as devices/components extrinsic or separate from network switches but operating in conjunction with network switches. In some operational scenarios, tunable alignment buffers 710 can be used to optionally support triggering backpressure (e.g., PAUSE/PFC, ethernet pause/priority based flow control, etc.) to upstream device for the purpose of ensures that packet loss does not occur due to delay alignment operations. Additionally, optionally or alternatively, the last hop delay alignment can be used to operate in scenarios in which cumulative skews between different transmission links are relatively small.

4.0. Example Embodiments

Figure 9A:
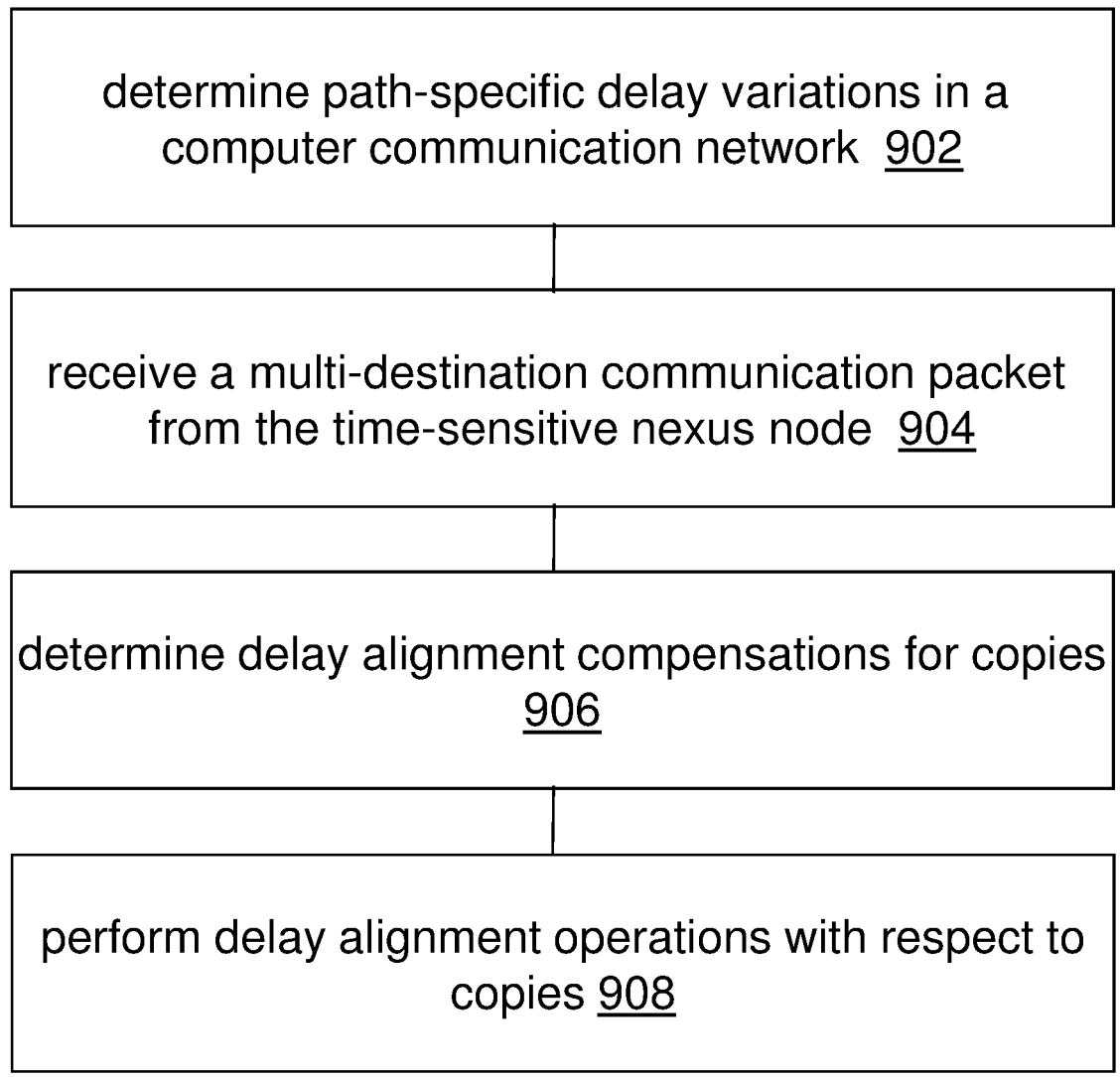
FIG. 9A and FIG. 9B illustrate example process flows.

FIG. 9A illustrates an example process flow, according to an embodiment. The various elements of the flow described below may be performed by one or more network devices implemented with one or more computing devices. In block 902, path-specific delay variations in a computer communication network between a time-sensitive nexus node and a plurality of time-sensitive non-nexus nodes are determined (e.g., by an operator of a network or network nodes therein, etc.). The time-sensitive nexus node and the time-sensitive non-nexus nodes communicate through one or more intermediate network nodes.

In block 904, a multi-destination communication packet is received (e.g., by one or more intermediate network nodes, etc.) from the time-sensitive nexus node. The multi-destination communication packet is to be replicated by the one or more intermediate network nodes into a plurality of copies of the multi-destination communication packet for transmission to the plurality of time-sensitive non-nexus nodes.

In block 906, one or more delay alignment compensations for one or more copies in the plurality of copies of the multi-destination communication packet are determined based on the path-specific delay variations by a first intermediate network node of the one or more intermediate network nodes.

In block 908, one or more second intermediate network nodes are caused to use the one or more delay alignment compensations to perform delay alignment operations with respect to the one or more copies in the plurality of copies of the multi-destination communication packet. The one or more copies in the plurality of copies of the multi-destination communication packet are received by one or more time-sensitive non-nexus nodes in the plurality of time-sensitive non-nexus nodes.

In an embodiment, the path-specific delay variations are determined based at least in part on timestamps of packets traversing the computer communication network.

In an embodiment, the path-specific delay variations are determined based at least in part on packets traversing the computer communication network without performing any delay variation alignment operations with respect to the packets.

In an embodiment, the delay alignment operations include at least one of: per-copy delay alignment operation, delay alignment operation based at least in part on memory indirection, per-burst delay alignment operation, delay alignment operation based at least in part on transmit window, multi-hop delay alignment operation, last-hop delay alignment operation, etc.

In an embodiment, the path-specific delay variations are incurred at one or more of: an initial network node of the intermediate network nodes; one or more final network nodes of the intermediate network nodes; one or more other nodes of the intermediate network nodes other than the initial and final network nodes; one or more switching fabrics of one or more of the intermediate network nodes; replicating the packet by one or more of the intermediate network nodes; internal buffering, queuing and processing logics of one or more of the intermediate network nodes; scheduling logics of egress ports of one or more of the intermediate network nodes; transmission links between one or more of the intermediate network nodes and one or more next hops; etc.

In an embodiment, at least one of the delay alignment operations is performed locally by a specific intermediate network node using a specific delay alignment compensation locally determined by the specific intermediate network node.

In an embodiment, the specific delay alignment compensation is represented by a specific departure eligible time set for a specific egress port; the specific departure eligible time is determined based on local delay variations incurred at the specific intermediate node and remote delay variations incurred at network nodes other than the specific intermediate node.

In an embodiment, at least one of the delay alignment operations is deferred by a first specific intermediate network node to be performed remotely by a second specific intermediate network node using a specific delay alignment compensation including a specific delay alignment compensation portion determined by the first specific intermediate network node.

In an embodiment, second delay alignment operations are performed on a second unicast packet from one of the time-sensitive non-nexus nodes to the time-sensitive nexus node.

Figure 9B:
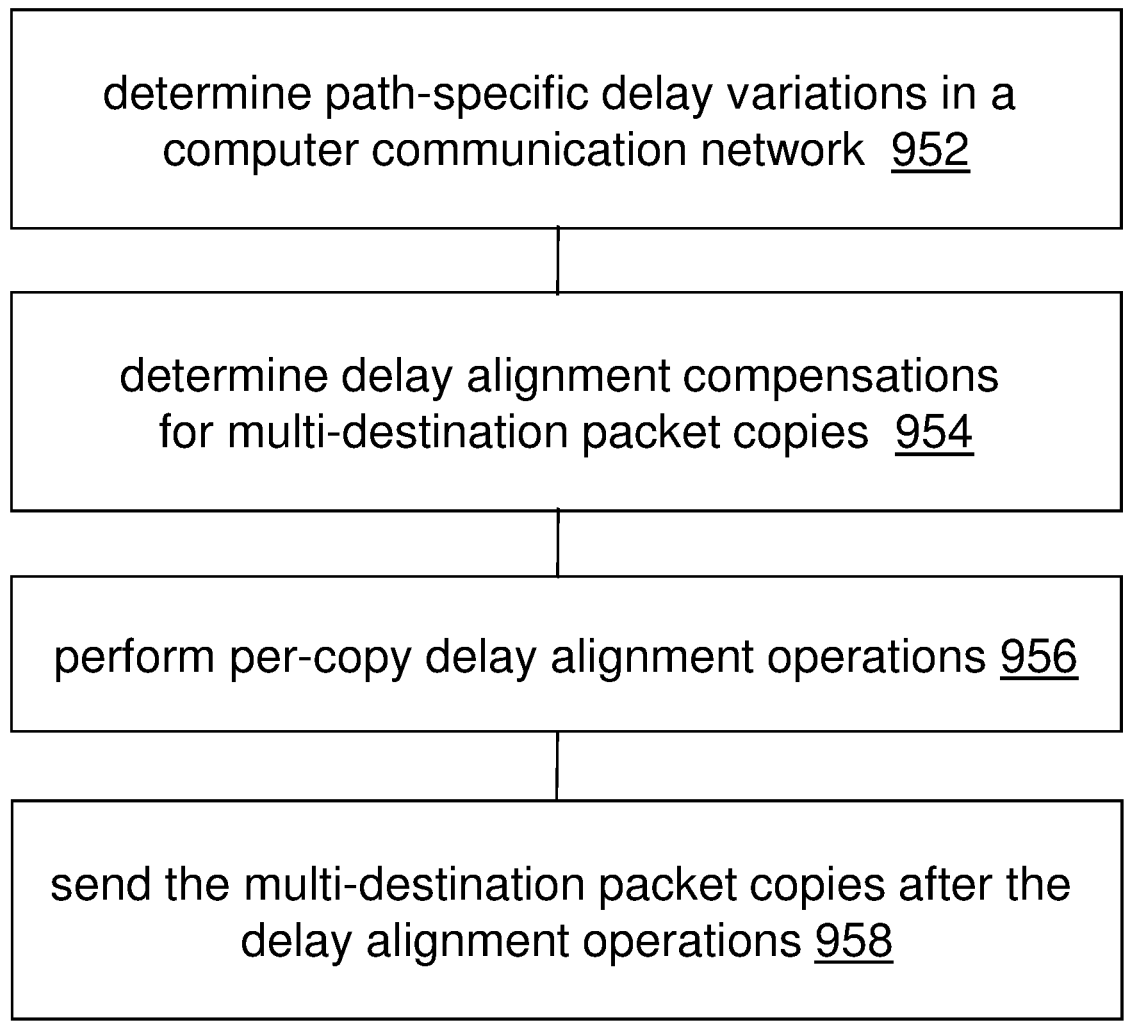

FIG. 9B illustrates an example process flow, according to an embodiment. The various elements of the flow described below may be performed by one or more network devices implemented with one or more computing devices. In block 952, a time-sensitive nexus node (e.g., a source node, the first access network node receiving a multi-destination packet from an adjacent source node connected to the first access network node, etc.) determines path-specific delay variations in a computer communication network between the time-sensitive nexus node and a plurality of time-sensitive non-nexus nodes.

In block 954, the time-sensitive nexus node determines, based on the path-specific delay variations, a plurality of copy-specific delay alignment compensations for a plurality of copies of a multi-destination communication packet. The plurality of copies of the multi-destination communication packet is to be sent by the time-sensitive nexus node to the plurality of time-sensitive non-nexus nodes respectively.

In block 956, the time-sensitive nexus node uses the plurality of per-copy delay alignment compensations to perform a plurality of per-copy delay alignment operations with respect to the plurality of copies of the multi-destination communication packet.

In block 958, the time-sensitive nexus node sends each copy of the multi-destination communication packet in the plurality of copies of the multi-destination communication packet to a respective time-sensitive non-nexus node in the plurality of time-sensitive non-nexus nodes after a respective per-copy delay alignment operation in the plurality of per-copy delay alignment operations is performed for the copy of the multi-destination communication packet.

In an embodiment, the path-specific delay variations are determined based at least in part on timestamps of packets traversing the computer communication network.

In an embodiment, the path-specific delay variations are determined based at least in part on packets traversing the computer communication network without performing any delay variation alignment operations with respect to the packets.

In an embodiment, the plurality of per-copy delay alignment operations includes at least one of: per-copy delay alignment operation, delay alignment operation based at least in part on memory indirection, per-burst delay alignment operation, delay alignment operation based at least in part on transmit window, multi-hop delay alignment operation, last-hop delay alignment operation, etc.

In an embodiment, the path-specific delay variations are incurred at one or more of: an initial network node of the intermediate network nodes; one or more final network nodes of the intermediate network nodes; one or more other nodes of the intermediate network nodes other than the initial and final network nodes; one or more switching fabrics of one or more of the intermediate network nodes; replicating the packet by one or more of the intermediate network nodes; internal buffering, queuing and processing logics of one or more of the intermediate network nodes; scheduling logics of egress ports of one or more of the intermediate network nodes; transmission links between one or more of the intermediate network nodes and one or more next hops; etc.

In an embodiment, at least one of the plurality of per-copy delay alignment operations is performed locally by the time-sensitive nexus node using a delay alignment compensation locally determined by the time-sensitive nexus node.

In an embodiment, the delay alignment compensation is represented by a specific departure eligible time set for a specific egress port.

In an embodiment, a computing device such as a switch, a router, a line card in a chassis, a network device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 8:
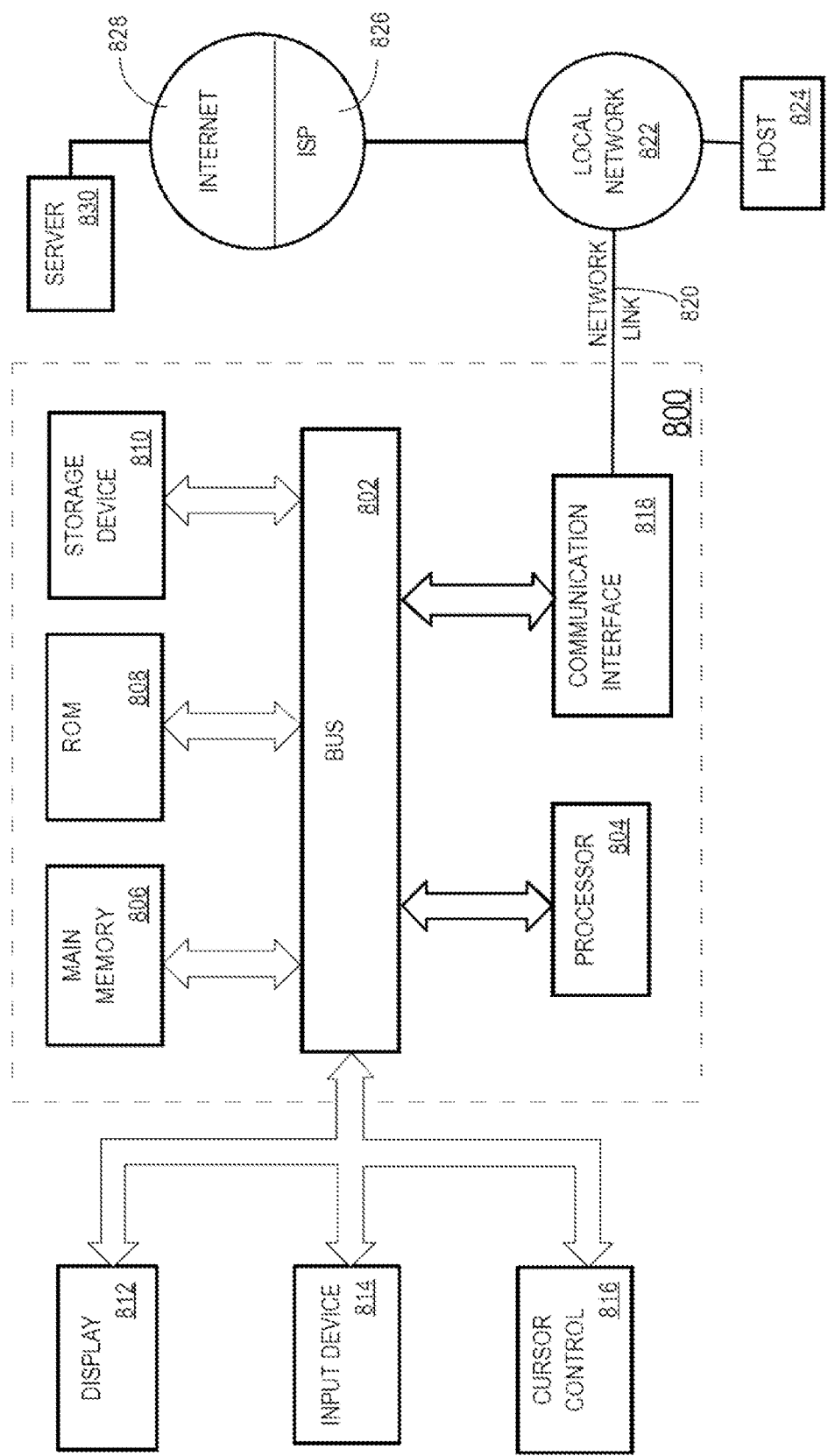
FIG. 8 is block diagram of an example computer system upon which embodiments of the inventive subject matter may be implemented.

FIG. 8 is a block diagram that illustrates an example computer system 1300 that may be utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device. In an embodiment, FIG. 8 constitutes a different view of the devices and systems described in previous sections.

Computer system 800 may include one or more ASICs, FPGAs, or other specialized circuitry 803 for implementing program logic as described herein. For example, circuitry 803 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 800 may include one or more hardware processors 804 configured to execute software-based instructions. Computer system 800 may also include one or more busses 802 or other communication mechanism for communicating information. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes one or more memories 806, such as a RAM, hardware registers, or other dynamic or volatile storage device for storing data units to be processed by the one or more ASICs, FPGAs, or other specialized circuitry 803. Memory 806 may also or instead be used for storing information and instructions to be executed by processor 804. Memory 806 may be directly connected or embedded within circuitry 803 or a processor 804. Or, memory 806 may be coupled to and accessed via bus 802. Memory 806 also may be used for storing temporary variables, data units describing rules or policies, or other intermediate information during execution of program logic or instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, may optionally be provided and coupled to bus 802 for storing information and instructions.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as an 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world-wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send and receive data units through the network(s), network link 820, and communication interface 818. In some embodiments, this data may be data units that the computer system 800 has been asked to process and, if necessary, redirect to other computer systems via a suitable network link 820. In other embodiments, this data may be instructions for implementing various processes related to the described techniques. For instance, in the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

Computer system 800 may optionally be coupled via bus 802 to one or more displays 812 for presenting information to a computer user. For instance, computer system 800 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are optionally coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

As discussed, computer system 800 may implement techniques described herein using customized hard-wired logic, one or more ASICs or FPGAs 803, firmware and/or program logic, which in combination with the computer system causes or programs computer system 800 to be a special-purpose machine. According to one embodiment, however, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

7.0. Enumerated Exemplary Embodiments

The invention may be embodied in any of the forms described herein, including, but not limited to the following Enumerated Example Embodiments (EEEs) which describe structure, features, and functionality of some portions of embodiments of the present invention.

EEE1. A method comprising:
  determining path-specific delay variations in a computer communication network between a time-sensitive nexus node and a plurality of time-sensitive non-nexus nodes, wherein the time-sensitive nexus node and the time-sensitive non-nexus nodes communicate through one or more intermediate network nodes;
  receiving a multi-destination communication packet from the time-sensitive nexus node, wherein the multi-destination communication packet is to be replicated by the one or more intermediate network nodes into a plurality of copies of the multi-destination communication packet for transmission to the plurality of time-sensitive non-nexus nodes;
  determining, based on the path-specific delay variations by a first intermediate network node of the one or more intermediate network nodes, one or more delay alignment compensations for one or more copies in the plurality of copies of the multi-destination communication packet;
  causing one or more second intermediate network nodes to use the one or more delay alignment compensations to perform delay alignment operations with respect to the one or more copies in the plurality of copies of the multi-destination communication packet, wherein the one or more copies in the plurality of copies of the multi-destination communication packet are received by one or more time-sensitive non-nexus nodes in the plurality of time-sensitive non-nexus nodes.

EEE2. The method of EEE1, wherein the path-specific delay variations are determined based at least in part on timestamps of packets traversing the computer communication network.

EEE3. The method of EEE1, wherein the path-specific delay variations are determined based at least in part on packets traversing the computer communication network without performing any delay variation alignment operations with respect to the packets.

EEE4. The method of EEE1, wherein the delay alignment operations include at least one of: per-copy delay alignment operation, delay alignment operation based at least in part on memory indirection, per-burst delay alignment operation, delay alignment operation based at least in part on transmit window, multi-hop delay alignment operation, or last-hop delay alignment operation.

EEE5. The method of EEE1, wherein the path-specific delay variations are incurred at one or more of: an initial network node of the intermediate network nodes; one or more final network nodes of the intermediate network nodes; one or more other nodes of the intermediate network nodes other than the initial and final network nodes; one or more switching fabrics of one or more of the intermediate network nodes; replicating the packet by one or more of the intermediate network nodes; internal buffering, queuing and processing logics of one or more of the intermediate network nodes; scheduling logics of egress ports of one or more of the intermediate network nodes; or transmission links between one or more of the intermediate network nodes and one or more next hops.

EEE6. The method of EEE1, wherein at least one of the delay alignment operations is performed locally by a specific intermediate network node using a specific delay alignment compensation locally determined by the specific intermediate network node.

EEE7. The method of EEE6, wherein the specific delay alignment compensation is represented by a specific departure eligible time set for a specific egress port; wherein the specific departure eligible time is determined based on local delay variations incurred at the specific intermediate node and remote delay variations incurred at network nodes other than the specific intermediate node.

EEE8. The method of EEE1, wherein at least one of the delay alignment operations is deferred by a first specific intermediate network node to be performed remotely by a second specific intermediate network node using a specific delay alignment compensation including a specific delay alignment compensation portion determined by the first specific intermediate network node.

EEE9. The method of EEE1, wherein second delay alignment operations are performed on a second unicast packet from one of the time-sensitive non-nexus nodes to the time-sensitive nexus node.

EEE10. An apparatus comprising a processor and configured to perform any one of the methods recited in EEE1-EEE9.

EEE11. A non-transitory computer-readable storage medium having stored thereon computer-executable instruction for executing a method with one or more processors in accordance with any of the methods recited in EEE1-EEE9.

EEE12. A computer system configured to perform any one of the methods recited in EEE1-EEE9.

What is claimed is:
1. A method comprising:
  determining path-specific delay variations in a computer communication network between a time-sensitive nexus node and a plurality of time-sensitive non-nexus nodes;
  determining, by the time-sensitive nexus node based on the path-specific delay variations, a plurality of copy-specific delay alignment compensations for a plurality of copies of a multi-destination communication packet, wherein the plurality of copies of the multi-destination communication packet is to be sent by the time-sensitive nexus node to the plurality of time-sensitive non-nexus nodes respectively;
  using, by the time-sensitive nexus node, the plurality of per-copy delay alignment compensations to perform a plurality of per-copy delay alignment operations with respect to the plurality of copies of the multi-destination communication packet;
  sending, by the time-sensitive nexus node, each copy of the multi-destination communication packet in the plurality of copies of the multi-destination communication packet to a respective time-sensitive non-nexus node in the plurality of time-sensitive non-nexus nodes after a respective per-copy delay alignment operation in the plurality of per-copy delay alignment operations is performed for the copy of the multi-destination communication packet.

2. The method of claim 1, wherein the path-specific delay variations are determined based at least in part on timestamps of packets traversing the computer communication network.

3. The method of claim 1, wherein the path-specific delay variations are determined based at least in part on packets traversing the computer communication network without performing any delay variation alignment operations with respect to the packets.

4. The method of claim 1, wherein the plurality of per-copy delay alignment operations includes at least one of: per-copy delay alignment operation, delay alignment operation based at least in part on memory indirection, per-burst delay alignment operation, delay alignment operation based at least in part on transmit window, multi-hop delay alignment operation, or last-hop delay alignment operation.

5. The method of claim 1, wherein the path-specific delay variations are incurred at one or more of: an initial network node of the intermediate network nodes; one or more final network nodes of the intermediate network nodes; one or more other nodes of the intermediate network nodes other than the initial and final network nodes; one or more switching fabrics of one or more of the intermediate network nodes; replicating the packet by one or more of the intermediate network nodes; internal buffering, queuing and processing logics of one or more of the intermediate network nodes; scheduling logics of egress ports of one or more of the intermediate network nodes; or transmission links between one or more of the intermediate network nodes and one or more next hops.

6. The method of claim 1, wherein at least one of the plurality of per-copy delay alignment operations is performed locally by the time-sensitive nexus node using a delay alignment compensation locally determined by the time-sensitive nexus node.

7. The method of claim 6, wherein the delay alignment compensation is represented by a specific departure eligible time set for a specific egress port.

8. A system comprising:
one or more computing devices;
one or more non-transitory computer readable media storing instructions that, when executed by the one or more computing devices, cause performance of:
determining path-specific delay variations in a computer communication network between a time-sensitive nexus node and a plurality of time-sensitive non-nexus nodes;
determining, by the time-sensitive nexus node based on the path-specific delay variations, a plurality of copy-specific delay alignment compensations for a plurality of copies of a multi-destination communication packet, wherein the plurality of copies of the multi-destination communication packet is to be sent by the time-sensitive nexus node to the plurality of time-sensitive non-nexus nodes respectively;
using, by the time-sensitive nexus node, the plurality of per-copy delay alignment compensations to perform a plurality of per-copy delay alignment operations with respect to the plurality of copies of the multi-destination communication packet;
sending, by the time-sensitive nexus node, each copy of the multi-destination communication packet in the plurality of copies of the multi-destination communication packet to a respective time-sensitive non-nexus node in the plurality of time-sensitive non-nexus nodes after a respective per-copy delay alignment operation in the plurality of per-copy delay alignment operations is performed for the copy of the multi-destination communication packet.

9. The system of claim 8, wherein the path-specific delay variations are determined based at least in part on timestamps of packets traversing the computer communication network.

10. The system of claim 8, wherein the path-specific delay variations are determined based at least in part on packets traversing the computer communication network without performing any delay variation alignment operations with respect to the packets.

11. The system of claim 8, wherein the plurality of per-copy delay alignment operations includes at least one of: per-copy delay alignment operation, delay alignment operation based at least in part on memory indirection, per-burst delay alignment operation, delay alignment operation based at least in part on transmit window, multi-hop delay alignment operation, or last-hop delay alignment operation.

12. The system of claim 8, wherein the path-specific delay variations are incurred at one or more of: an initial network node of the intermediate network nodes; one or more final network nodes of the intermediate network nodes; one or more other nodes of the intermediate network nodes other than the initial and final network nodes; one or more switching fabrics of one or more of the intermediate network nodes; replicating the packet by one or more of the intermediate network nodes; internal buffering, queuing and processing logics of one or more of the intermediate network nodes; scheduling logics of egress ports of one or more of the intermediate network nodes; or transmission links between one or more of the intermediate network nodes and one or more next hops.

13. The system of claim 8, wherein at least one of the plurality of per-copy delay alignment operations is performed locally by the time-sensitive nexus node using a delay alignment compensation locally determined by the time-sensitive nexus node.

14. The system of claim 8, wherein the delay alignment compensation is represented by a specific departure eligible time set for a specific egress port.

15. One or more non-transitory computer readable media storing instructions that, when executed by one or more computing devices, cause performance of:
determining path-specific delay variations in a computer communication network between a time-sensitive nexus node and a plurality of time-sensitive non-nexus nodes;
determining, by the time-sensitive nexus node based on the path-specific delay variations, a plurality of copy-specific delay alignment compensations for a plurality of copies of a multi-destination communication packet, wherein the plurality of copies of the multi-destination communication packet is to be sent by the time-sensitive nexus node to the plurality of time-sensitive non-nexus nodes respectively;
using, by the time-sensitive nexus node, the plurality of per-copy delay alignment compensations to perform a plurality of per-copy delay alignment operations with respect to the plurality of copies of the multi-destination communication packet;
sending, by the time-sensitive nexus node, each copy of the multi-destination communication packet in the plurality of copies of the multi-destination communication packet to a respective time-sensitive non-nexus node in the plurality of time-sensitive non-nexus nodes after a respective per-copy delay alignment operation in the plurality of per-copy delay alignment operations is performed for the copy of the multi-destination communication packet.

16. The one or more non-transitory computer readable media of claim 15, wherein the path-specific delay variations are determined based at least in part on timestamps of packets traversing the computer communication network.

17. The one or more non-transitory computer readable media of claim 15, wherein the path-specific delay variations are determined based at least in part on packets traversing the computer communication network without performing any delay variation alignment operations with respect to the packets.

18. The one or more non-transitory computer readable media of claim 15, wherein the plurality of per-copy delay alignment operations includes at least one of: per-copy delay alignment operation, delay alignment operation based at least in part on memory indirection, per-burst delay alignment operation, delay alignment operation based at least in part on transmit window, multi-hop delay alignment operation, or last-hop delay alignment operation.

19. The one or more non-transitory computer readable media of claim 15, wherein the path-specific delay variations are incurred at one or more of: an initial network node of the intermediate network nodes; one or more final network nodes of the intermediate network nodes; one or more other nodes of the intermediate network nodes other than the initial and final network nodes; one or more switching fabrics of one or more of the intermediate network nodes; replicating the packet by one or more of the intermediate network nodes; internal buffering, queuing and processing logics of one or more of the intermediate network nodes; scheduling logics of egress ports of one or more of the intermediate network nodes; or transmission links between one or more of the intermediate network nodes and one or more next hops.

20. The one or more non-transitory computer readable media of claim 15, wherein at least one of the plurality of per-copy delay alignment operations is performed locally by the time-sensitive nexus node using a delay alignment compensation locally determined by the time-sensitive nexus node.

21. The one or more non-transitory computer readable media of claim 15, wherein the delay alignment compensation is represented by a specific departure eligible time set for a specific egress port.

* * * * *